US012672158B2

(12) United States Patent
Dallal et al.

(10) Patent No.: US 12,672,158 B2
(45) Date of Patent: Jun. 30, 2026

(54) TRANSPONDER SIGNALING FOR LOCALIZATION ON HIGHER BANDS

(71) Applicant: QUALCOMM Incorporated, San Diego, CA (US)

(72) Inventors: Yehonatan Dallal, Kfar Saba (IL); Ran Berliner, Kfar aviv (IL); Shay Landis, Hod Hasharon (IL)

( * ) Notice: Subject to any disclaimer, the term of this patent is extended or adjusted under 35 U.S.C. 154(b) by 230 days.

(21) Appl. No.: 18/399,486

(22) Filed: Dec. 28, 2023

(65) Prior Publication Data

US 2024/0129939 A1     Apr. 18, 2024

Related U.S. Application Data

(62) Division of application No. 17/246,041, filed on Apr. 30, 2021, now Pat. No. 11,895,677.

(51) Int. Cl.
*H04W 72/51*          (2023.01)
*H04B 1/59*           (2006.01)
          (Continued)

(52) U.S. Cl.
CPC .............. *H04W 72/51* (2023.01); *H04B 1/59* (2013.01); *H04B 7/06952* (2023.05);
          (Continued)

(58) Field of Classification Search
CPC ..... G01S 13/75; H04W 64/003; H04W 72/51; H04W 72/542; H04W 8/24; H04W 68/02; H04W 72/044; H04B 7/06952; H04B 1/59
See application file for complete search history.

(56) References Cited

U.S. PATENT DOCUMENTS

| | | | | |
|---|---|---|---|---|
| 10,588,064 B2 * | 3/2020 | Zhang | ............... | H04W 36/0094 |
| 2020/0112917 A1 | 4/2020 | Nam et al. | | |

(Continued)

FOREIGN PATENT DOCUMENTS

| | | | | | |
|---|---|---|---|---|---|
| CN | 1284220 A | * | 2/2001 | ........... | G01S 5/0246 |
| CN | 105388457 A | * | 3/2016 | ............... | G01S 5/18 |

(Continued)

OTHER PUBLICATIONS

International Search Report and Written Opinion—PCT/US2022/026047—ISA/EPO—Nov. 17, 2022.

(Continued)

*Primary Examiner* — Dung Hong

(57)          ABSTRACT

Methods, systems, and devices for wireless communications are described. Some wireless networks may maintain up-to-date location information for the UE by periodically determining the location the UE using a low power transponding mechanism while the UE is in an inactive state. The UE may monitor a first beam to receive one or more transponder search signals during one or more transponder occasions, and between paging attempts from one or more of the base stations of the network. The UE may receive the one or more transponder search signals, and may transmit a transponder response message to a base station including a UE identifier associated with the inactive state. The base station may receive the transponder response message, and may conduct various location measurements for the UE using the transponder response.

18 Claims, 19 Drawing Sheets

(51) Int. Cl.

| | |
|---|---|
| *H04B 7/06* | (2006.01) |
| *H04W 8/24* | (2009.01) |
| *H04W 68/02* | (2009.01) |
| *H04W 72/044* | (2023.01) |
| *H04W 72/542* | (2023.01) |

(52) U.S. Cl.
CPC ............. *H04W 8/24* (2013.01); *H04W 68/02* (2013.01); *H04W 72/044* (2013.01); *H04W 72/542* (2023.01)

(56) References Cited

U.S. PATENT DOCUMENTS

| | | | |
|---|---|---|---|
| 2020/0162900 A1 | 5/2020 | Nakarmi et al. | |
| 2020/0404620 A1 | 12/2020 | Sang et al. | |
| 2021/0120622 A1* | 4/2021 | Fujishiro | .............. H04W 76/30 |

| | | | | |
|---|---|---|---|---|
| 2021/0250892 A1* | 8/2021 | Kim | ...................... | H04L 5/0048 |
| 2022/0046540 A1 | 2/2022 | Kwon et al. | | |
| 2022/0110085 A1* | 4/2022 | Khoryaev | ......... | H04W 74/0833 |
| 2022/0353858 A1 | 11/2022 | Dallal et al. | | |

FOREIGN PATENT DOCUMENTS

| | | | | | | |
|---|---|---|---|---|---|---|
| CN | 111903090 A | * | 11/2020 | .......... | H04W 64/003 |
| DE | 69834549 T2 | * | 5/2007 | ............. | G01S 11/16 |
| KR | 20160013857 A | * | 2/2016 | ............. | H04W 8/04 |
| WO | 2019029520 A1 | | 2/2019 | | |
| WO | 2020060696 A1 | | 3/2020 | | |

OTHER PUBLICATIONS

Partial International Search Report—PCT/US2022/026047—ISA/EPO—Aug. 8, 2022.

* cited by examiner

910

915

920

905

900

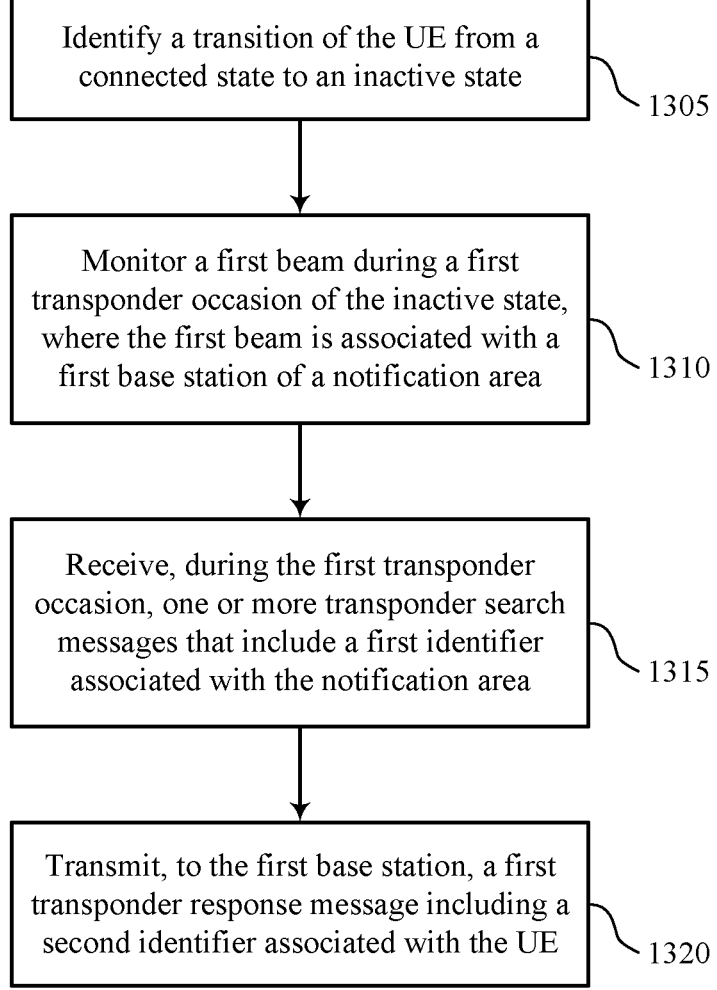

Identify a transition of the UE from a
connected state to an inactive state

1305

Monitor a first beam during a first
transponder occasion of the inactive state,
where the first beam is associated with a
first base station of a notification area

1310

Receive, during the first transponder
occasion, one or more transponder search
messages that include a first identifier
associated with the notification area

1315

Transmit, to the first base station, a first
transponder response message including a
second identifier associated with the UE

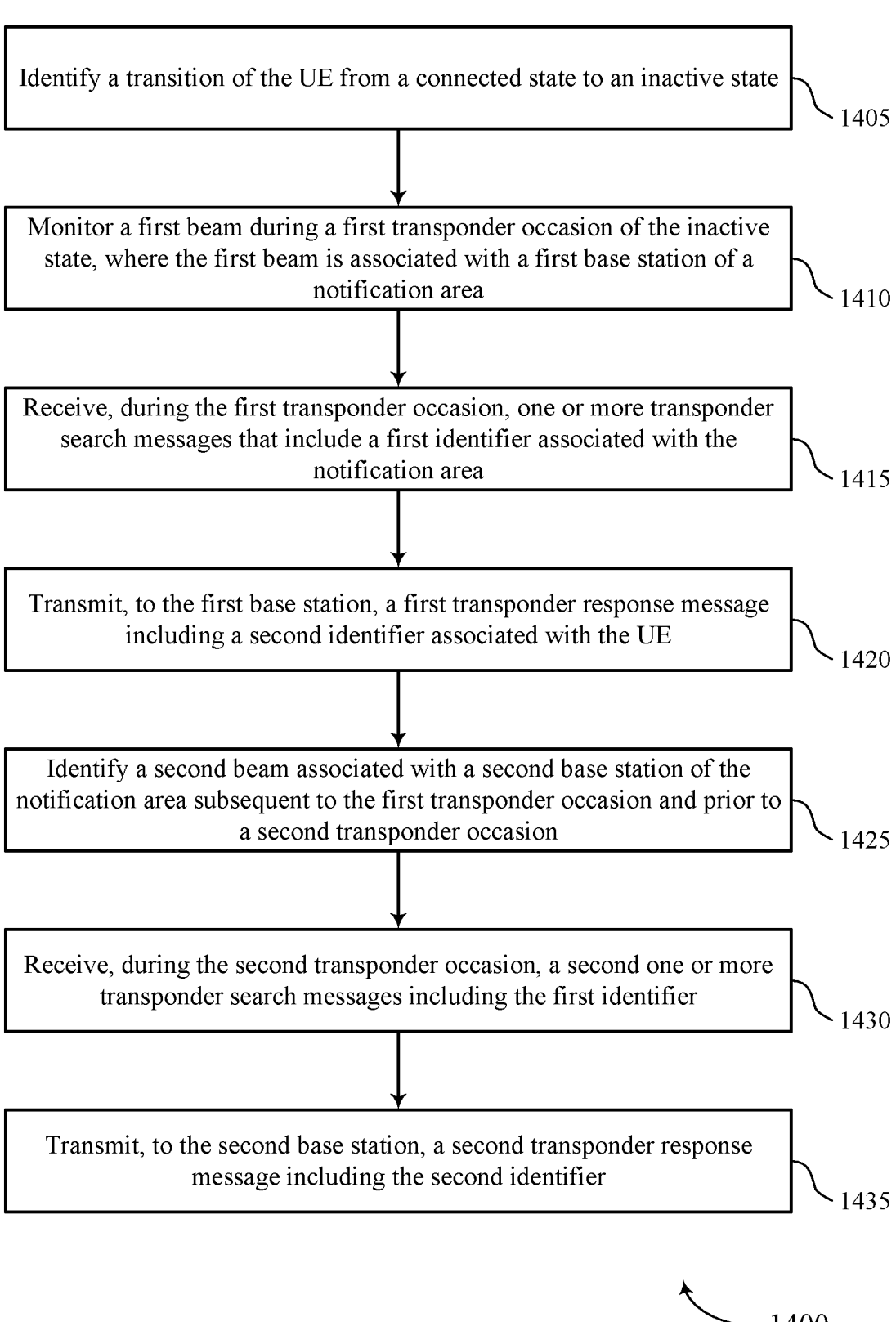

Identify a transition of the UE from a connected state to an inactive state
1405

Monitor a first beam during a first transponder occasion of the inactive state, where the first beam is associated with a first base station of a notification area
1410

Receive, during the first transponder occasion, one or more transponder search messages that include a first identifier associated with the notification area
1415

Transmit, to the first base station, a first transponder response message including a second identifier associated with the UE
1420

Identify a second beam associated with a second base station of the notification area subsequent to the first transponder occasion and prior to a second transponder occasion
1425

Receive, during the second transponder occasion, a second one or more transponder search messages including the first identifier
1430

Transmit, to the second base station, a second transponder response message including the second identifier
1435

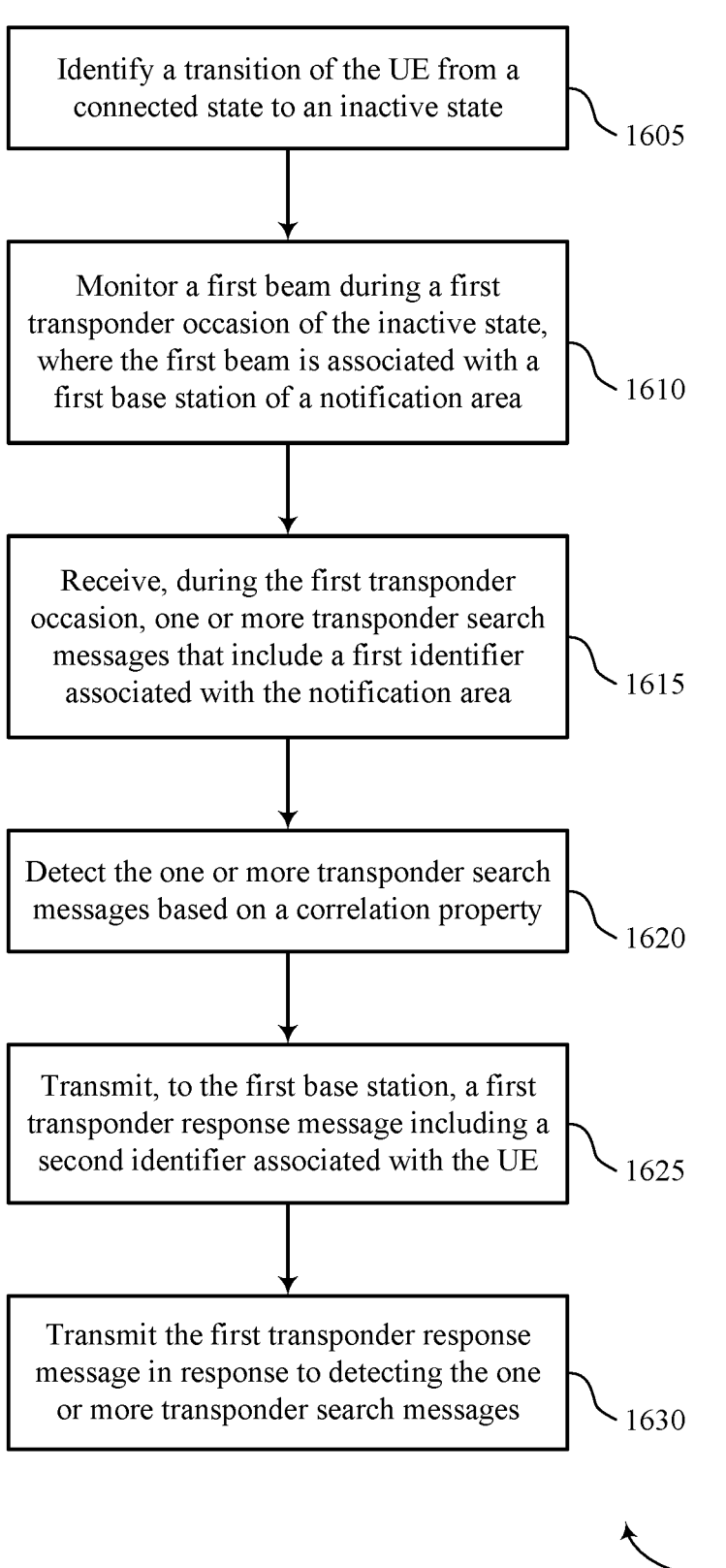

Identify a transition of the UE from a connected state to an inactive state

1605

Monitor a first beam during a first transponder occasion of the inactive state, where the first beam is associated with a first base station of a notification area

1610

Receive, during the first transponder occasion, one or more transponder search messages that include a first identifier associated with the notification area

1615

Detect the one or more transponder search messages based on a correlation property

1620

Transmit, to the first base station, a first transponder response message including a second identifier associated with the UE

1625

Transmit the first transponder response message in response to detecting the one or more transponder search messages

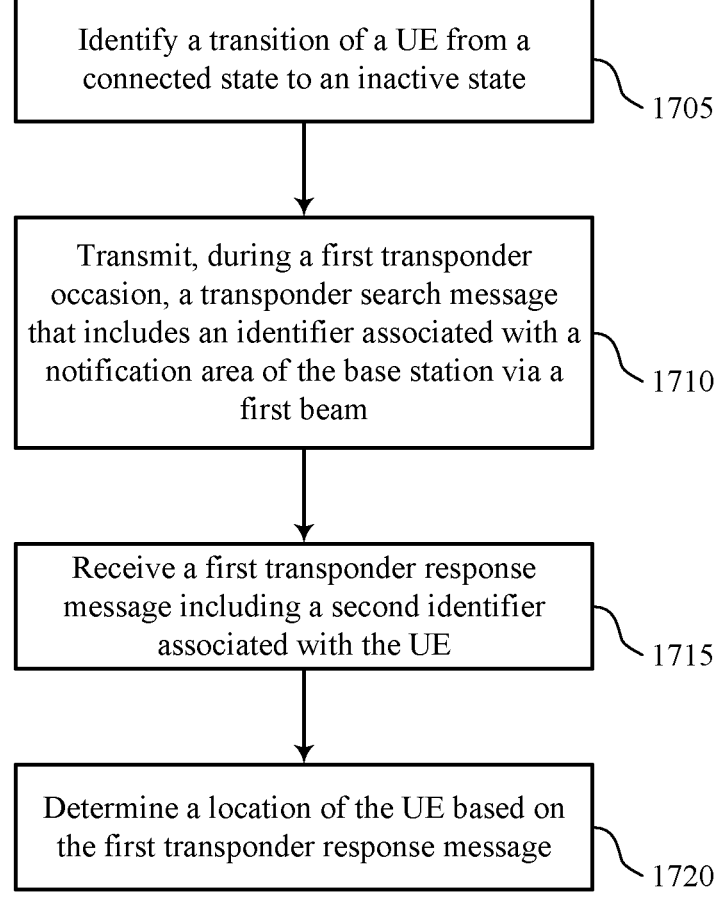

Identify a transition of a UE from a
connected state to an inactive state

1705

Transmit, during a first transponder
occasion, a transponder search message
that includes an identifier associated with a
notification area of the base station via a
first beam

1710

Receive a first transponder response
message including a second identifier
associated with the UE

1715

Determine a location of the UE based on
the first transponder response message

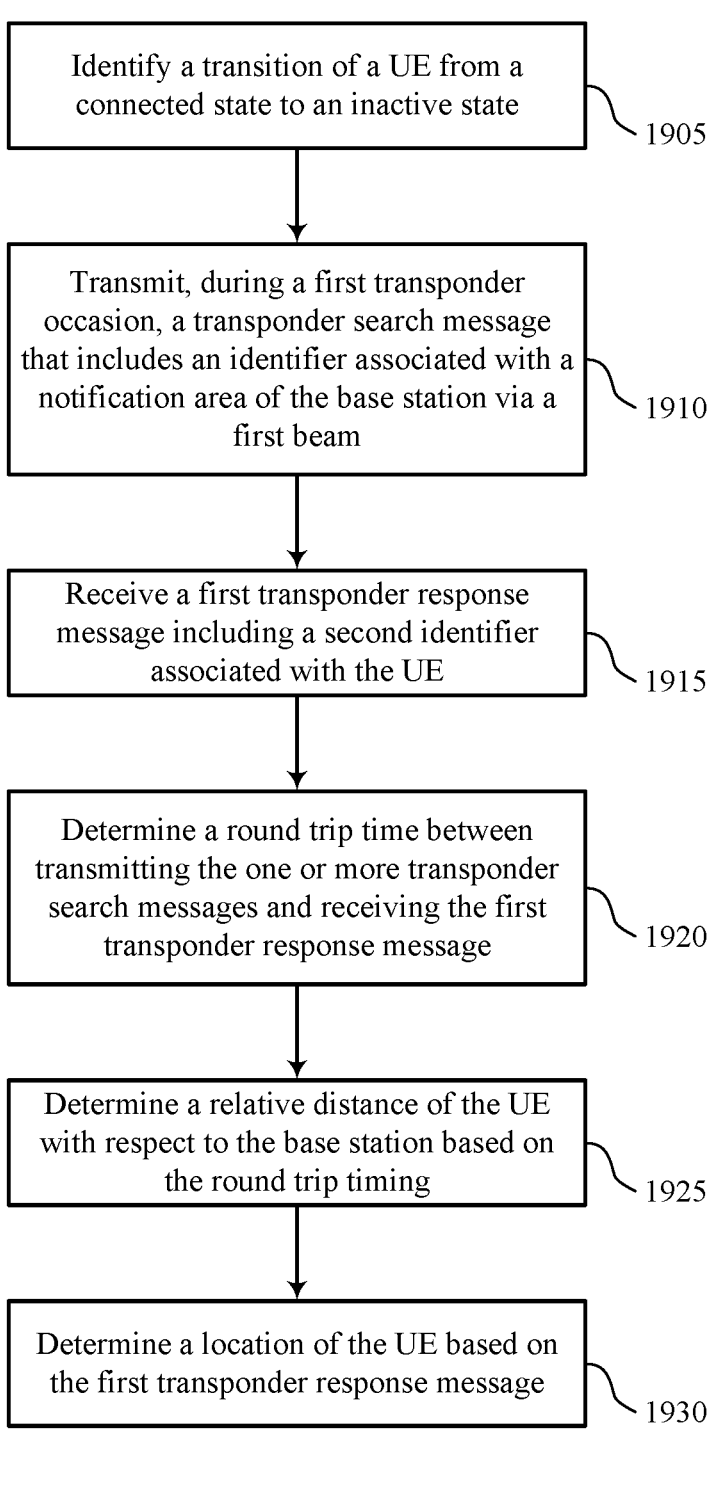

Identify a transition of a UE from a connected state to an inactive state

1905

Transmit, during a first transponder occasion, a transponder search message that includes an identifier associated with a notification area of the base station via a first beam

1910

Receive a first transponder response message including a second identifier associated with the UE

1915

Determine a round trip time between transmitting the one or more transponder search messages and receiving the first transponder response message

1920

Determine a relative distance of the UE with respect to the base station based on the round trip timing

1925

Determine a location of the UE based on the first transponder response message

TRANSPONDER SIGNALING FOR LOCALIZATION ON HIGHER BANDS

CROSS REFERENCE

The present application for patent is a divisional of U.S. patent application Ser. No. 17/246,041 by DALLAL et al., entitled "TRANSPONDER SIGNALING FOR LOCAL-IZATION ON HIGHER BANDS," filed Apr. 30, 2021, assigned to the assignee hereof, and expressly incorporated by reference herein.

FIELD OF TECHNOLOGY

The following relates to wireless communications, including transponder signaling for localization on higher bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform (DFT) spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications networks may implement various techniques for maintaining updated location information for a UE. Conventional localization techniques for the determining the location of the UE in the network, however, may be deficient.

SUMMARY

The described techniques relate to improved methods, systems, devices, and apparatuses that support transponder signaling for localization on higher bands. Generally, the described techniques provide for improved techniques for localizing a user equipment (UE) within a network area. Some wireless communications systems may implement various paging techniques to identify a location of the UE with respect to a given radio access network notification area (RNA). In some cases, one or more base stations of the RNA may transmit paging messages periodically to localize the UE within the RNA. In some examples of beamformed systems, however, coarse localization of the UE 115 to an area of the RNA using some paging techniques may be inefficient. To maintain communications between a UE and a base station of the RNA, the network may attempt to maintain up-to-date location information for the UE by periodically determining the location the UE using a low power transponding mechanism. For example, the UE may monitor a first beam to receive transponder search signals while in an inactive state during one or more transponder occasions, and between paging attempts from one or more of the base stations in the RNA. The UE may respond using a low power transponder response message, which may allow for relative localization of the UE in the RNA by a base station that may use the transponder response message to conduct various location measurements for the UE.

A method for wireless communications at a user equipment (UE) is described. The method may include identifying a transition of the UE from a connected state to an inactive state, monitoring a first beam during a first transponder occasion of the inactive state, where the first beam is associated with a first base station of a notification area, receiving, during the first transponder occasion, one or more transponder search messages that include a first identifier associated with the notification area, and transmitting, to the first base station, a first transponder response message including a second identifier associated with the UE.

An apparatus for wireless communications at a UE is described. The apparatus may include a processor, memory coupled with the processor, and instructions stored in the memory. The instructions may be executable by the processor to cause the apparatus to identify a transition of the UE from a connected state to an inactive state, monitor a first beam during a first transponder occasion of the inactive state, where the first beam is associated with a first base station of a notification area, receive, during the first transponder occasion, one or more transponder search messages that include a first identifier associated with the notification area, and transmit, to the first base station, a first transponder response message including a second identifier associated with the UE.

Another apparatus for wireless communications at a UE is described. The apparatus may include means for identifying a transition of the UE from a connected state to an inactive state, means for monitoring a first beam during a first transponder occasion of the inactive state, where the first beam is associated with a first base station of a notification area, means for receiving, during the first transponder occasion, one or more transponder search messages that include a first identifier associated with the notification area, and means for transmitting, to the first base station, a first transponder response message including a second identifier associated with the UE.

A non-transitory computer-readable medium storing code for wireless communications at a UE is described. The code may include instructions executable by a processor to identify a transition of the UE from a connected state to an inactive state, monitor a first beam during a first transponder occasion of the inactive state, where the first beam is associated with a first base station of a notification area, receive, during the first transponder occasion, one or more transponder search messages that include a first identifier associated with the notification area, and transmit, to the first base station, a first transponder response message including a second identifier associated with the UE.

Some examples of the method, apparatuses, and non-transitory computer-readable medium described herein may further include operations, features, means, or instructions for identifying a second beam associated with a second base station of the notification area subsequent to the first transponder occasion and prior to a second transponder occasion, receiving, during the second transponder occasion, a second one or more transponder search messages including the first identifier, and transmitting, to the second base station, a second transponder response message including the second identifier.

In some examples of the method, apparatuses, and non-transitory computer-readable medium described herein, identifying the second beam may include operations, features, means, or instructions for comparing the first beam and the second beam based on one or more beam measurements of beam sweep signals transmitted by the first base station and the second base station.

Some examples of the method, apparatuses, and non-transitory computer-readable medium described herein may further include operations, features, means, or instructions for identifying a first periodicity for receiving the one or more transponder search messages during a set of multiple transponder occasions associated with the notification area and monitoring the first beam during a second transponder occasion of the inactive state in accordance with the first periodicity.

Some examples of the method, apparatuses, and non-transitory computer-readable medium described herein may further include operations, features, means, or instructions for identifying a second periodicity for receiving one or more paging messages during a set of multiple paging occasions, where the second periodicity for receiving the one or more paging messages may be shorter than the first periodicity for receiving the one or more transponder search messages and monitoring for paging messages during the set of multiple paging occasions according to the first beam.

In some examples of the method, apparatuses, and non-transitory computer-readable medium described herein, the first periodicity may be based on a mobility profile of the UE, power consumption of the UE, or both.

Some examples of the method, apparatuses, and non-transitory computer-readable medium described herein may further include operations, features, means, or instructions for detecting the one or more transponder search messages based on a correlation property and transmitting the first transponder response message in response to detecting the one or more transponder search messages.

In some examples of the method, apparatuses, and non-transitory computer-readable medium described herein, the first transponder response message includes one or more data fields for indicating one or more measurements associated with the UE, the one or more measurements including a UE transmission power level, timing parameters, battery status of the UE, user interaction history, operating temperature, or any combination thereof.

In some examples of the method, apparatuses, and non-transitory computer-readable medium described herein, the second identifier of the first transponder response message includes a radio network temporary identifier associated with the inactive state of the UE.

In some examples of the method, apparatuses, and non-transitory computer-readable medium described herein, receiving the one or more transponder search messages may include operations, features, means, or instructions for performing a beam sweep of a set of multiple receive beams during transmission of the one or more transponder search messages and selecting a transmission beam for transmitting the first transponder response message based on the performing the beam sweep.

In some examples of the method, apparatuses, and non-transitory computer-readable medium described herein, the UE includes a first receiver operating at a first power for receiving control and data channel transmissions from the first base station and a second receiver operating at a second and the method, apparatuses, and non-transitory computer-readable medium may include further operations, features, means, or instructions for receiving, during the first transponder occasion, the one or more transponder search messages at the second receiver of the UE.

Some examples of the method, apparatuses, and non-transitory computer-readable medium described herein may further include operations, features, means, or instructions for determining a slot boundary based on the one or more transponder search messages and transmitting the first transponder response message at the slot boundary.

A method is described. The method may include transmitting the first transponder response message at a predetermined time offset from the one or more transponder search messages in response to receiving the one or more transponder search messages.

An apparatus is described. The apparatus may include a processor, memory coupled with the processor, and instructions stored in the memory. The instructions may be executable by the processor to cause the apparatus to transmit the first transponder response message at a predetermined time offset from the one or more transponder search messages in response to receiving the one or more transponder search messages.

Another apparatus is described. The apparatus may include means for transmitting the first transponder response message at a predetermined time offset from the one or more transponder search messages in response to receiving the one or more transponder search messages.

A non-transitory computer-readable medium storing code is described. The code may include instructions executable by a processor to transmit the first transponder response message at a predetermined time offset from the one or more transponder search messages in response to receiving the one or more transponder search messages.

A method for wireless communications at a base station is described. The method may include identifying a transition of a UE from a connected state to an inactive state, transmitting, during a first transponder occasion, a transponder search message that includes an identifier associated with a notification area of the base station via a first beam, receiving a first transponder response message including a second identifier associated with the UE, and determining a location of the UE based on the first transponder response message.

An apparatus for wireless communications at a base station is described. The apparatus may include a processor, memory coupled with the processor, and instructions stored in the memory. The instructions may be executable by the processor to cause the apparatus to identify a transition of a UE from a connected state to an inactive state, transmit, during a first transponder occasion, a transponder search message that includes an identifier associated with a notification area of the base station via a first beam, receive a first transponder response message including a second identifier associated with the UE, and determine a location of the UE based on the first transponder response message.

Another apparatus for wireless communications at a base station is described. The apparatus may include means for identifying a transition of a UE from a connected state to an inactive state, means for transmitting, during a first transponder occasion, a transponder search message that includes an identifier associated with a notification area of the base station via a first beam, means for receiving a first transponder response message including a second identifier associated with the UE, and means for determining a location of the UE based on the first transponder response message.

A non-transitory computer-readable medium storing code for wireless communications at a base station is described. The code may include instructions executable by a processor to identify a transition of a UE from a connected state to an inactive state, transmit, during a first transponder occasion, a transponder search message that includes an identifier associated with a notification area of the base station via a first beam, receive a first transponder response message including a second identifier associated with the UE, and determine a location of the UE based on the first transponder response message.

Some examples of the method, apparatuses, and non-transitory computer-readable medium described herein may further include operations, features, means, or instructions for identifying a first periodicity for a set of multiple transponder occasions associated with the notification area, the set of multiple transponder occasions including the first transponder occasion and transmitting the transponder search message in each of the set of multiple transponder occasions in accordance with the first periodicity.

Some examples of the method, apparatuses, and non-transitory computer-readable medium described herein may further include operations, features, means, or instructions for identifying a second periodicity for transmitting one or more paging messages during a set of multiple paging occasions, where the second periodicity for transmitting the one or more paging messages may be longer than the first periodicity for transmitting the transponder search message, transmitting the one or more paging messages based on the second periodicity, and receiving, during a first paging occasion, an indication of a location of the UE based on the first transponder response message.

In some examples of the method, apparatuses, and non-transitory computer-readable medium described herein, the first periodicity may be based on a mobility profile of the UE, power consumption of the UE, or both.

In some examples of the method, apparatuses, and non-transitory computer-readable medium described herein, determining the location of the UE may include operations, features, means, or instructions for determining an angle of arrival of the first beam associated with receiving the first transponder response message and determining a relative direction of the UE with respect to the base station based on the angle of arrival of the first beam.

Some examples of the method, apparatuses, and non-transitory computer-readable medium described herein may further include operations, features, means, or instructions for determining a round-trip time between transmitting the transponder search message and receiving the first transponder response message and determining a relative distance of the UE with respect to the base station based on the round-trip time.

In some examples of the method, apparatuses, and non-transitory computer-readable medium described herein, the transponder search message may be associated with a correlation property for detection using an analog correlation circuit.

Some examples of the method, apparatuses, and non-transitory computer-readable medium described herein may further include operations, features, means, or instructions for identifying the first beam based on a prior communication with the UE.

Some examples of the method, apparatuses, and non-transitory computer-readable medium described herein may further include operations, features, means, or instructions for identifying the first beam based on a prior communication of a second base station with the UE or a last known location of the UE.

In some examples of the method, apparatuses, and non-transitory computer-readable medium described herein, the second identifier of the first transponder response message includes a radio network temporary identifier associated with the inactive state of the UE.

Some examples of the method, apparatuses, and non-transitory computer-readable medium described herein may further include operations, features, means, or instructions for receiving the first transponder response message multiplexed with one or more other transponder response messages from one or more additional UEs based on the radio network temporary identifier.

In some examples of the method, apparatuses, and non-transitory computer-readable medium described herein, the first transponder response message includes one or more data fields for indicating one or more measurements associated with the UE, the one or more measurements including a UE transmission power level, timing and frequency parameters, battery status of the UE, user interaction history, operating temperature, or any combination thereof.

Some examples of the method, apparatuses, and non-transitory computer-readable medium described herein may further include operations, features, means, or instructions for monitoring for the first transponder response message at a predetermined offset from the transponder search message.

BRIEF DESCRIPTION OF THE DRAWINGS

FIGS. 13 through 19 show flowcharts illustrating methods that support transponder signaling for localization on higher bands in accordance with aspects of the present disclosure.

DETAILED DESCRIPTION

Figure 1:
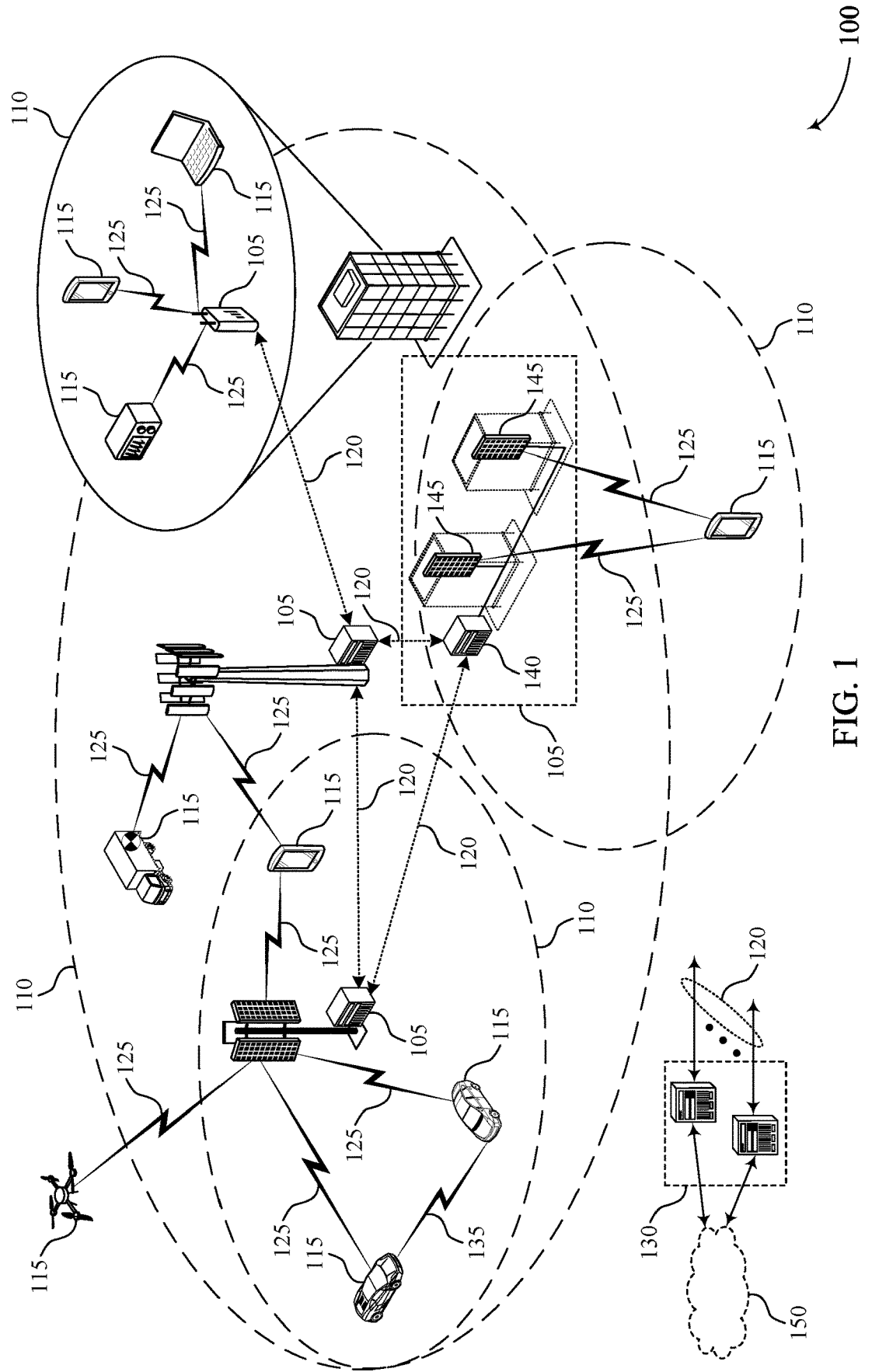
FIG. 1 illustrates an example of a wireless communications system that supports transponder signaling for localization on higher bands in accordance with aspects of the present disclosure.

Some wireless communications systems (for example, millimeter wave (mmW) or new radio (NR) wireless system), may support directional beamforming techniques to reduce signaling attenuation and pathloss associated with high frequency communications in higher bands. In some examples, the system may implement various paging techniques to identify a location of user equipment (UE) with respect to a given network area, for example, a radio access network notification area (RNA). A paging procedure may allow for routing communications (e.g., for directing an incoming call or transmitting data) between a UE and a base station of the RNA while the UE is in an inactive or idle state. In some cases, one or more base stations of the RNA may transmit paging messages periodically to localize the UE within the RNA.

Since the spatial coverage of each narrow transmission beam may be limited, however, base stations may transmit paging messages over an extensive set of narrow transmission beams, increasing signaling overhead and system complexity. In such examples of beamformed systems, coarse localization of the UE to an area of the RNA using conventional paging techniques may be inefficient. For example, in some cases, a beam association that the UE identifies during a first paging occasion may no longer be relevant (e.g., based on UE movement, pathloss, changing system conditions, etc.) by the time a second paging occasion occurs. The UE 115-*a* may then initiate a beam sweep of receive beams to determine a valid beam association, increasing delay between paging and response, and further increasing system latency.

To maintain a valid beam pairing between the UE and a base station located in the RNA, the network may attempt to maintain up to date location information for the UE. To increase network efficiency and reduce repetitive paging attempts used for updating location information, the wireless communications system may employ techniques for periodically determining the location the UE using a low power transponding mechanism. In such cases, the transponding mechanism may allow for frequent localization updating of the UE such that each time paging occurs, a base station may identify a relative location or a last known beam of the UE in the RNA. For example, the UE may monitor one or more synchronization signal blocks (SSBs) to receive transponder search signals while in an inactive state and between paging attempts from one or more of the base stations in the RNA. The UE (while in the inactive state) may update a cell or beam on which it camps without necessarily notifying the base stations of the RNA of such an update. The UE may, however, utilize the updated cell or beam to monitor future transponder signals. The network (e.g., base stations) may update the RNA of the UE when the UE transmits a paging or transponder response message on a different cell or beam from which it received the transponder search signal.

The UE may respond using a low power transponder response message, which may allow for relative localization of the UE in the RNA by a base station that may use the transponder response message to conduct various location measurements for the UE (e.g., round trip time (RTT) measurements, angle of arrival (AoA) measurements). In addition, the network may update the last known cell or beam for the UE based on receiving the transponder response message, thus simplifying future paging attempts because the network has more up to date location information for the UE.

Particular aspects of the subject matter described herein may be implemented to realize one or more advantages. The described techniques may support improvements in UE localization for paging by supporting simple and robust localization of UEs in a cell associated with an RNA. In some examples, the techniques may allow for increased time that the UE may spend in an inactive or sleep state through the introduction of a wake-up-receiver and processing-power optimized waveforms, a power optimized receiver and transmitter (e.g., a transponder), and the like. In addition, the techniques may increase the accuracy of tracking area measurements for the UE, and may allow a network to maintain updated location information for the UE. Further, the signaling techniques described may be low-power, and transponder signaling may not require baseband processing, thus extending battery life of the UE. As such, supported techniques may include improved network operations and, in some examples, may promote increased communications efficiency, among other benefits.

Aspects of the disclosure are initially described in the context of wireless communications systems. For example, aspects of the disclosure may be described in the context of a transponding procedure between one or more base stations of an RNA and UE. Aspects of the disclosure are further illustrated by and described with reference to apparatus diagrams, system diagrams, a transponding procedure, a process flow, and flowcharts that relate to transponder signaling for localization on higher bands.

FIG. 1 illustrates an example of a wireless communications system 100 that supports transponder signaling for localization on higher bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform (DFT) spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta_f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems (for example, mmW or NR wireless system), may support directional beamforming techniques to reduce signaling attenuation and pathloss associated with high frequency communications in higher bands. In some examples, the system may implement various paging techniques to identify a location of one or more UE 115 with respect to a given network area, for example, an RNA. A paging procedure may allow for routing communications (e.g., for directing an incoming call or transmitting data) between a UE 115 and a base station 105 of the RNA while the UE 115 is in an inactive or idle state. In some cases, one or more base stations of the RNA may transmit paging messages periodically to localize the UE within the RNA.

Since the spatial coverage of each narrow transmission beam may be limited, however, base stations 105 may transmit paging messages over an extensive set of narrow transmission beams, increasing signaling overhead and system complexity. In such examples of beamformed systems, coarse localization of the UE 115 to an area of the RNA using conventional paging techniques may be inefficient.

To maintain a valid beam pairing between the UE 115 and a base station 105 located in the RNA, the network may attempt to maintain up-to-date location information for the UE 115 by periodically determining the location the UE 115 using a low-power transponding mechanism. In such cases, the transponding mechanism may allow for frequent localization updating of the UE 115 such that each time paging occurs, a base station may identify a relative location or a last known beam of the UE in the RNA. For example, the UE 115 may receive transponder search signals while in an inactive state and between paging attempts from one or more of the base stations in the RNA. The UE 115 may respond using a low power transponder response message, which may allow for relative localization of the UE in the RNA by a base station that may use the transponder response message to conduct various location measurements for the UE 115. Based on localizing the UE 115 using transponder occasions, subsequent paging attempts may be simplified because the network may have a more accurate sense of where the UE 115 is located, thus reducing the number of paging attempts needed by the network to locate the UE.

Figure 2:
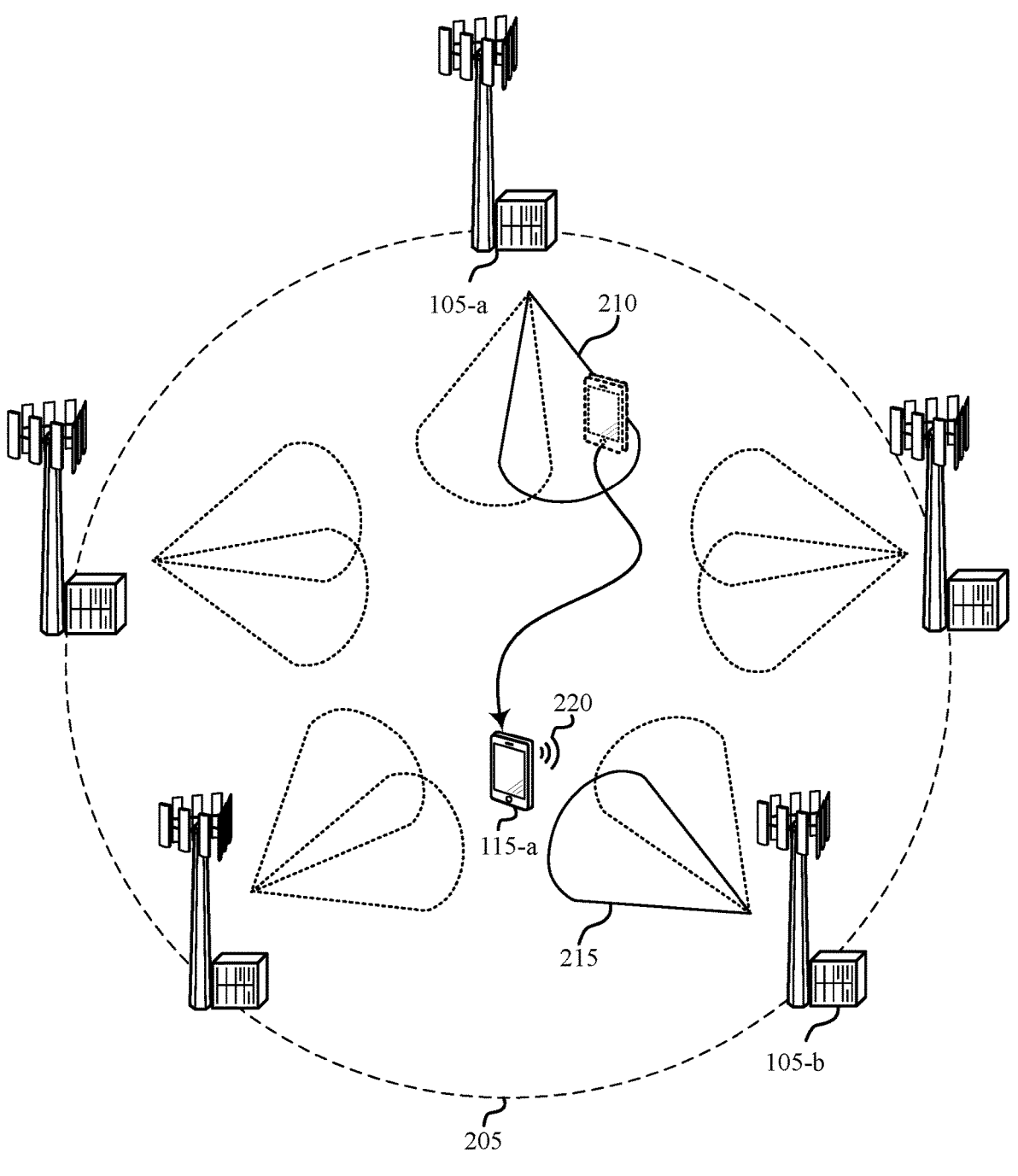
FIG. 2 illustrates an example of a wireless communications system that supports transponder signaling for localization on higher bands in accordance with aspects of the present disclosure.

FIG. 2 illustrates an example of a wireless communications system 200 that supports transponder signaling for localization on higher bands in accordance with aspects of the present disclosure. In some examples, wireless communications system 200 may implement aspects of wireless communications system 100. For example, the wireless communications system 200 may include base stations 105 (e.g., base stations 105-a, 105-b, and a number of other base stations 105) and UE 115-a, which may be examples of base stations 105 and a UE 115 as described with reference to FIG. 1. Base stations 105 may serve a number of cells or geographic coverage areas, and may be associated with a same RNA 205.

Wireless communications system 200 (which may be an example of a mmW or NR wireless system), may support directional beamforming techniques to reduce signaling attenuation and pathloss associated with high frequency communications in higher bands. In some examples, the network may implement paging techniques to identify a location of UEs associated with an area of the network, for example, a location of the UE 115-a associated with an RNA 205 served by base stations 105. The paging procedure may allow for routing communications (e.g., for directing an incoming call or initializing transmission of data) between the UE 115-*a* and a base station of the RNA while the UE 115-*a* is in an inactive or idle state. In some cases, base stations 105 may broadcast paging messages periodically to determine the location of UE 115-*a* within a given network area. Since the spatial coverage of each transmission beam may be limited (e.g., due to narrow beams used in a mmW system), however, base stations may transmit paging messages over an extensive set of narrow transmission beams.

In such examples of beamformed systems, coarse localization of the UE 115-*a* to an area of the RNA using conventional paging techniques may be inefficient. For example, in some cases, a beam association that the UE 115-*a* identifies during a first paging occasion (e.g., a beam association associated with beam 210) may no longer be relevant (e.g., based on UE movement, pathloss, changing system conditions, etc.) by the time a second paging occasion occurs. The UE 115-*a* may then initiate a beam sweep of receive beams to determine a valid beam association, increasing delay between paging and response, and further increasing system latency.

To maintain a valid beam pairing between the UE 115-*a* and a base station 105 located in the RNA, the network may attempt to maintain up to date location information for the UE. Keeping location information updated, however, may include repetitive paging attempts. Because each paging attempt may involve the UE coming out of a low-power state such as idle to a connected mode to respond to the paging, increased paging frequency may reduce the ability of the UE 115-*a* to remain in a low-power state, thus reducing battery performance.

To increase network efficiency and reduce repetitive paging attempts, the wireless communications system 200 may employ techniques for determining a location of the UE 115-*a* using a low power transponding mechanism. In such cases, the transponding may allow for frequent localization updating of the UE 115-*a* such that each time paging occurs, a base station 105 may have more accurate location information for the UE 115-*a* in the RNA.

The UE 115-*a* may receive a transponder search signal while in an inactive state and between paging attempts from one or more of the base stations in the RNA. In some cases, the UE 115-*a* may monitor one or more synchronization signal blocks (SSBs) to receive transponder search signals while in the inactive state. The UE 115-*a* may update the cell or beam on which it camps (e.g., the cell or beam with which the UE 115-*a* receives the transponder search signal) to a different cell or beam (e.g., an updated cell or beam with higher communications quality) without necessarily notifying the RNA of such an update. The UE 115-*a* may, however, utilize the updated cell or beam to monitor future transponder signals. The RNA of the UE may be updated by the network when the UE 115-*a* transmits a paging or transponder response message on the updated cell or beam from which it received the transponder search signal.

The UE may respond using a low power transponder response message (e.g., which may be on the same beam or a different beam than the beam that the UE 115-*a* received the transponder search signal) which may allow for relative localization of the UE 115-*a* in the RNA, as the base station may use the transponder response message to conduct various location measurements for the UE (e.g., RTT measurements, AoA measurements). In some examples, the UE 115-*a* may include an analog-front-end, a digital-front-end, and a baseband processor. The analog-front-end may include analog components for transmitting and receiving signals from base stations 105. For example, the analog-front-end may include mixers, filters, amplifiers, and the like. The digital-front-end may include components for converting signals between the analog and digital domains (e.g., analog-to-digital converters, digital-to-analog converters, digital filters, and the like). The baseband processor may include components for performing modulation, encoding, demodulation, and decoding of signals received via a physical channel such as a PDCCH, PDSCH, PUCCH, or PUSCH. For example, the baseband processor may perform operations such as DFT/Inverse DFT (IDFT), symbol mapping/demapping, and the like for signals communicated using OFDM or DFT-s-OFDM waveforms. In some examples, the transponder search and transponder response messages may be transmitted or received by the UE 115-*a* using limited or no processing using the baseband processor. For example, a transponder search message may be received and processed using the analog-front-end and digital-front-end using correlation or other analog or digital processing techniques that do not employ one or more of DFT/IDFT, modulation, encoding, demodulation, or decoding.

Localization processes, including location management using transponding techniques described herein, along with radio access network (RAN) paging, may allow for the UE 115-*a* in a relatively low-power state (e.g., an RRC inactive state) to move around in the RNA 205 without frequently transitioning back to a higher power state such as a connected state. While in a low-power or RRC inactive state, both the UE 115-*a* and base stations 105 store information about the UE transition from a connected state to an inactive state, in addition to the context of the UE (e.g., radio protocol information). The RRC_INACTIVE state is an intermediate state between an idle state (RRC_IDLE) and a connected state (RRC_CONNECTED). The RRC_INACTIVE state allows the UE 115-*a* to efficiently return to either connected or idle states by maintaining context information of a recent connection to reduce time and power consumption for reconnection to the network. In RRC_INACTIVE, the UE 115-*a* is registered with the network, via a registration management state RM-REGISTERED (e.g., the UE may be registered with a core network such as 5GC, where a serving access and mobility management function (AMF) and session management function (SMF) are allocated, an IP address allocated, and protocol data unit (PDU) session may be established for the UE).

The UE 115-*a* is further connected to the network via a connection management state CM-CONNECTED (e.g., the connected state may support non-access stratum (NAS) signaling and quality of service (QoS) flows among other paging triggers, and user plane activation). The UE 115-*a* may establish a connection with the network (e.g., a 5GC-NG-RAN connection for the user plane (UP) and the control plane (CP), using the previous connection configuration (e.g., the UE has context in stored in the NG-RAN and in the UE), or the UE 115-*a* may connect to the network using a different connection configuration.

In some examples, the RRC_INACTIVE state may be characterized by the use of the RNA 205, for example, the UE 115-*a* may receive a list of one or more serving base stations 105 or serving cells that constitute the RNA when it transitions to an inactive state. The UE 115-*a* may additionally or alternatively receive a list of configured RNAs that the UE 115-*a* may establish a connection with, where each RNA may be contained within the core network (CN) registration area and may be configured to support Xn connectivity (e.g., connection via the Xn interface may enable the UE 115-*a* to retrieve the context of the last serving base station). While in RRC_INACTIVE state, the UE 115-*a* may perform an RNA update (RNAU) procedure periodically or when the UE 115-*a* moves out of a configured RNA. For example, when a cell reselection is performed, the UE 115-*a* identifies an RNA for connection, and if the current RNA is different from the last RNA that the configured for the UE 115-*a*, then the UE 115-*a* may perform an RNAU.

In some examples, the UE 115-*a* may transition from an RRC_INACTIVE state to an RRC_CONNECTED state based on receiving a paging signal on a downlink (DL) user plane, DL signaling from one or more base stations 105 of the RNA, etc. In some examples, paging is triggered by the last serving base station which has a stored context of the UE 115-*a*, or by other base stations (e.g., using paging messages communicated over an Xn interface). While in an RRC_I-NACTIVE state, the UE 115-*a* may identify paging messages that are associated with the inactive state or the RNA. For example, the UE 115-*a* may listen for messages associated with the RNA 205. Similarly, the UE 115-*a* may be allocated a specific identifier for communications within the RNA 205 and associated with the RRC_INACTIVE state. For example, the UE 115-*a* may be allocated an inactive state radio network temporary identifier (RNTI) (e.g., an I-RNTI) via an RRC release message (e.g., when the UE 115-*a* transitions to an inactive state and receives the RRC message including SuspendConfig IE).

In some examples, the network may employ techniques to determine the relative location of the UE 115-*a* in RRC_I-NACTIVE state to reduce excessive paging attempts by the network. The network may use a transponding mechanism used to determine location information for the UE 115-*a* to supplement the UEs location information between paging attempts. Such updated location information for the UE 115-*a* may in some cases allow paging to be transmitted by single cell, or with a reduced set of beams (e.g., the network may identify the relative location of the UE 115-*a* before paging using the transponding mechanism, and may use fewer paging attempts over fewer beams to locate and page the UE 115-*a*).

The UE 115-*a* may initially be in a connected state (e.g., RRC_CONNECTED state) and connected to base station 105-*a* of the RNA 205. The UE 115-*a* may then transition to an inactive state (e.g., RRC_INACTIVE state). The last known beam for UE 115-*a* may thus be a beam 210 of base station 105-*a*. In the inactive state, the UE 115-*a* may listen for a number of synchronization signals transmitted by base stations 105 of the RNA. The UE 115-*a* may determine a "best" beam (e.g., a beam associated with high RSRP, SINR, etc.) associated with a synchronization signal block (SSB) transmitted by base station 105-*a*, and may select the beam for communications with the network. For example, at a first time, the UE 115-*a* may continue to select beam 210 associated with the base station 105-*a*. In some cases, however, the UE 115-*a* may change locations within the RNA 205 while in an inactive state, or network conditions may change such that beam 210 may no longer be valid for communication with the UE 115-*a*. Rather, the UE may determine a different beam to monitor associated with a different base station of the RNA (e.g., beam 215).

In some examples, the UE 115-*a* may switch reception of the transponder signals from beam 210 to beam 215 while operating in the inactive state. In some cases, the UE 115-*a* may switch beams while in the inactive state and may notify the RNA of the beam switch at the next transponding occasion or paging occasion, where the UE 115-*a* may respond to the RNA using the updated beam. Thus, response from the UE 115-*a* on a different beam 215 (e.g., different from the beam 210 in which the UE 115-*a* received the transponder search signal) may implicitly notify the RNA of the beam switch performed by the UE 115-*a* while in an idle mode.

The network may support localization of the UE 115-*a* using transponder occasions in addition to paging occasions. During a transponder occasion, the base stations 105 may transmit one or more transponder search signals to determine a relative location of the UE 115-*a*. The UE 115-*a* may listen for transponder search signals for a signal associated with beam 215 (e.g., a determined best beam), and may respond to the base station 105-*b* with a transponder response signal 220. The network (e.g., base station 105-*a*, base station 105-*b*, or a network entity coupled with base stations 105-*a* and 105-*b*) may update the last known cell of the UE 115-*a* (e.g., from a cell served by base station 105-*a* to a cell served by base station 105-*b*) based on receiving the transponder response 220, and the base station 105-*b* may perform measurements to determine a relative location of the UE 115-*a* based on the received transponder response. For example, the base station 105-*b* may use a determination of RTT or AoA of the transponder response 220 to determine a distance from the base station 105-*b* to the UE 115-*a*. Additionally or alternatively, the base station 105-*b* may use a direction and range of the transponder response signal to determine the location of the UE 115-*a*. Based on determining the relative location of the UE 115-*a* using the transponding mechanism, subsequent paging attempts may be simplified (e.g., the network may transmit paging attempts on beams associated with base station 105-*b*, thus reducing the number of beams used for transmitting paging signals).

Figure 3:
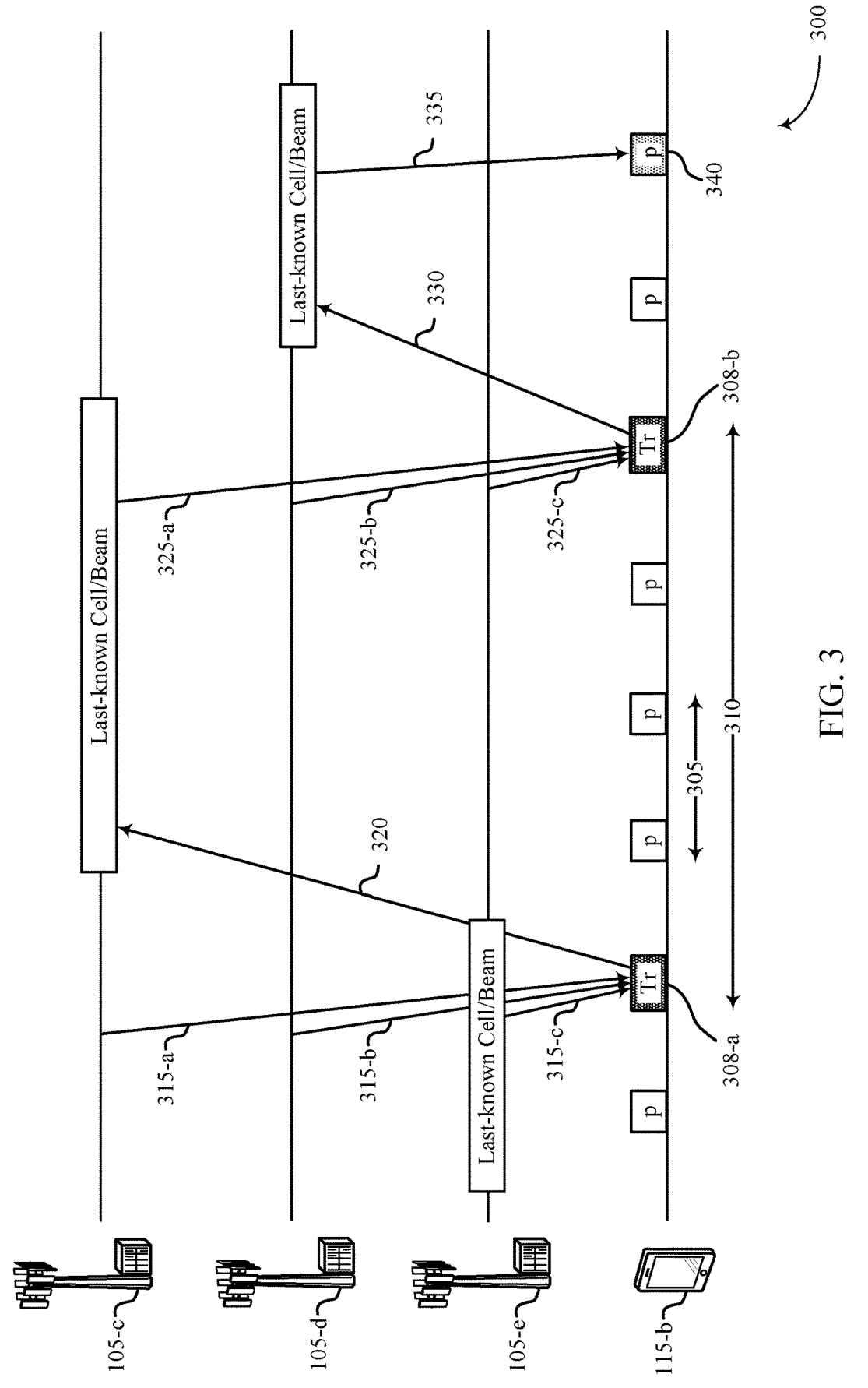
FIG. 3 illustrates an example of a transponding procedure that supports transponder signaling for localization on higher bands in accordance with aspects of the present disclosure.

FIG. 3 illustrates an example of a transponding procedure 300 that supports transponder signaling for localization on higher bands in accordance with aspects of the present disclosure. In some examples, transponding procedure 300 may implement aspects of wireless communications system 100. For example, transponding procedure 300 may include base stations 105 (e.g., base stations 105-*c*, 105-*d*, and 105-*d*) and UE 115-*a*, which may be examples of base stations 105 and a UE 115 as described with reference to FIGS. 1 and 2. Base stations 105 may serve a number of cells or geographic coverage areas, and may be associated with a same RNA.

The transponding procedure described with reference to FIG. 3 may include a number of paging occasions configured according to a paging periodicity 305, and a number of transponding occasions 308 configured according to a transponding periodicity 310. In some examples, the transponding periodicity may be longer than the paging periodicity to reduce standby battery consumption by the UE 115-*b*. In some examples, the periodicities may be adjusted based on a mobility profile of the UE 115-*b*.

The transponding procedure 300 may allow for localization of UE 115-*b* while the UE 115-*b* is in an inactive state (e.g., RRC_INACTIVE state), and may allow for the UE 115-*b* to update a last known cell or beam such that the network may maintain updated location information for the UE 115-*b* to reduce excessive paging attempts. In addition, the transponding procedure may reduce the number of RNA updates or periodic communications establishment procedures (e.g., RACH) the UE 115-*b* may perform while connected with the RNA.

In a first communications establishment process, the UE 115-*b* may be connected (e.g., in a connected state) with base station 105-*e*, which may serve a first cell of the RNA, and the UE 115-*b* may store information for the cell or selected beam associated with the base station 105-*e* as a "last known cell" or beam for ongoing communications. Subsequently, the UE 115-*b* may transition to the inactive state (e.g., RRC_INACTIVE state). The UE 115-*b* may perform beam measurement procedures during the inactive state to determine a cell with which to connect (e.g., the UE 115-*b* may periodically wake up and measure the SSBs for cells associated with base stations 105-*c*, 105-*d*, and 105-*e* in the RNA to find the best beam).

In some examples, after monitoring the cell associated with base station 105-*e*, the UE 115-*b* may change locations in the RNA, or may experience changing channel conditions such that the UE 115-*b* may determine a different cell (e.g., a cell associated with base station 105-*c*) to monitor based on performing a search and measure procedure.

The UE 115-*b* may receive transponder search signals 315-*a*, 315-*b*, and 315-*c* associated with base stations 105-*c*, 105-*d*, and 105-*e*, respectively, at the first transponder occasion 308-*a*. Based on identifying a beam associated with base station 105-*c* (e.g., detecting transponder search signals 315-*a* as a strongest signal), the UE 115-*b* may transmit a transponder response message 320 to the base station 105-*c*. Based on transmitting the transponder response message 320 to the base station 105-*c*, the UE 115-*b* may update its last known cell from the cell associated with base station 105-*e* to the cell associated with base station 105-*c*. In addition, the RNA associated with base stations 105-*c*, 105-*d*, 105-*e* may update the last known cell/beam for the UE 115-*b*. Each base station 105 of the RNA may also update its individual last known beam for the UE 115-*b* based on receiving the transponder response message 320, or via an indication of the location of UE 115-*b* provided by a different base station 105 that received transponder response message 320. In some examples, the UE 115-*b* may switch beams between transmissions of transponder response messages. In such cases, the UE 115-*b* may switch beams without explicitly notifying the RNA of the switch, but rather may switch beams in the inactive mode. The UE 115-*b* may transmit a transponder response message using the different beam than the beam used to receive the transponder search message, which may notify the RNA that the UE 115-*b* has switched from its last known cell or beam in between transponding occasions.

Similarly, after monitoring the cell associated with base station 105-*c*, the UE 115-*b* may again change locations in the RNA, or may experience additional changing channel conditions such that the UE 115-*b* may determine a different cell (e.g., a cell associated with base station 105-*d*) to monitor based on performing beam measurement procedures (e.g., measurements of SSBs of base stations 105 of the RNA).

The UE 115-*b* may receive transponder search signals 325-*a*, 325-*b*, and 325-*c* associated with base stations 105-*c*, 105-*d*, and 105-*e*, respectively, at the second transponder occasion 308-*b*. Based on identifying a beam associated with base station 105-*d*, the UE 115-*b* may transmit a transponder response message 330 to the base station 105-*d*. Based on transmitting the transponder response message to the base station 105-*d*, the UE 115-*b* may update its last know cell from the cell associated with base station 105-*c* to the cell associated with base station 105-*d*. During transponder occasions, the base station which receives a transponder response message may determine a relative location of the UE 115-*b* using a number of measurements (e.g., RTT measurements, AoA measurements of the transponder response message, etc.).

Based on determining the location of the UE 115-*b* using the transponding procedure, the base station 105-*d* may transmit a paging signal 335 to the UE 115-*b* using the last known beam identified by the UE 115-*b* during the second transponding occasion. By localizing the UE 115-*b* using the transponding procedure, the paging procedure may be simplified (e.g., base stations 105-*c* and 105-*e* may not transmit paging signals during the paging occasion based on the determined location of the UE and the association of the UE 115-*b* with the base station 105-*d*).

The transponder search signals 315 and 325 may have a number of different characteristics associated with transponding procedures in the wireless network. For example, transponder search signals may be different based on associated RNAs (e.g., each RNA may have an RNA-specific transponder search signal). The transponder search signals may be optimized for pattern detection with analog circuitry of the UE 115-*b* or minimal digital front end processing (for example, the UE 115-*b* may receive the transponder search message without baseband processing, or using relatively minimal baseband processing). In some cases, the UE 115-*b* may identify the transponder search message using a correlation property of the signal or using a match filter. The transponder search signal may further be associated with low power consumption and short wakeup of the UE 115-*b*. In some examples, the transponder search message may be detected at instances where the network is experiencing poor SNR conditions or time and frequency misalignment, among other signaling challenges.

Transponder response signals 320 and 330 may be transmitted in response to receiving one or more transponder search messages. Each transponder response message may carry a UE specific signature such as an inactive state-specific RNTI (e.g., I-RNTI) which may be configured as part of INACTIVE_RRC state transition (e.g., RRCRelease-IEs:: SuspendConfig::fullI-RNTI). The transponder response message may be optimized for pattern detection with analog circuitry and minimal digital front-end processing. For example, a base station 105 may not implement extensive digital processing (e.g., digital baseband processing such as DFT/IDFT) to interpret the transponder response message. In some examples, the transponder response message may be transmitted with the UE in a low-power mode such as a sleep mode (e.g., a baseband processor may be in a sleep mode or have a power supply disabled). For example, the signal may be transmitted directly from the digital front end, and may implement minimal D/A settings during RRC_IDLE or RRC_INACTIVE). In addition, the transponder response signal may have a multiplexing (e.g., code division multiplexing) capability to support multiple UEs responding simultaneously.

In addition to the UE-specific identifier (e.g., I-RNTI), the transponder response signal may include additional information associated with the UE 115-*b*. For example, the transponder response signal may include one or more optional data fields (e.g., data fields that the UE 115-*b* may determine to use based on a number of UE-specific measurements). In some examples, the data fields may indicate measurements of UE transmission power level, GPS time signatures or last known network time, frequency and timing lock status, battery status for the UE, operating temperature of the UE, a time since last user interaction, among other telemetries. In some cases, the UE 115-*b* may include measurements specific to the UE (e.g., measurements that may not be obtained using active measurements of the outside signal environment).

Figure 4:
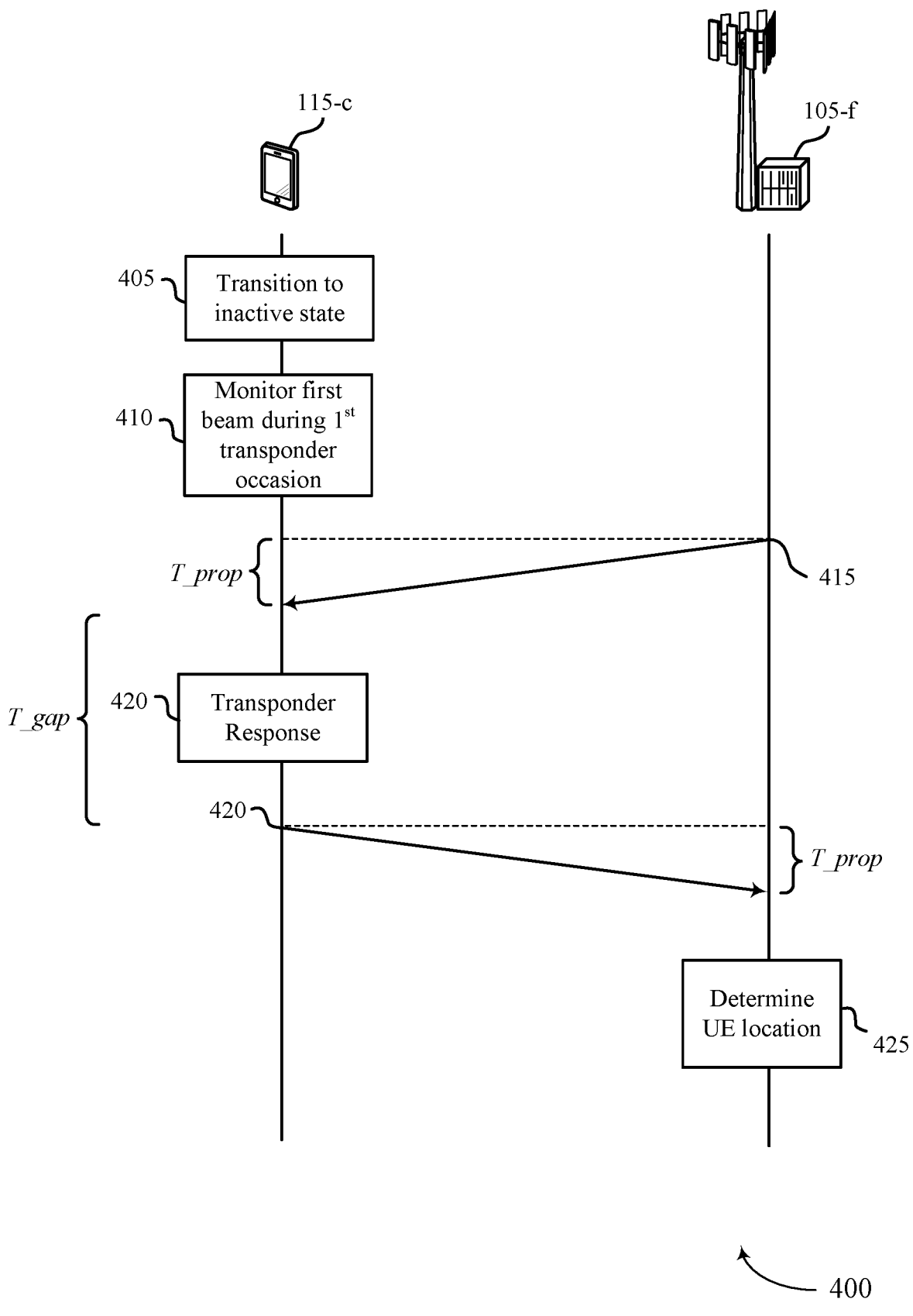
FIG. 4 illustrates an example of a process flow that supports transponder signaling for localization on higher bands in accordance with aspects of the present disclosure.

FIG. 4 illustrates an example of a process flow 400 that supports transponder signaling for localization on higher bands in accordance with aspects of the present disclosure.

In some examples, process flow 400 may implement aspects of wireless communications system 100. The process flow 400 includes UE 115-*c* and base station 105-*f* (e.g., which may be examples of the corresponding devices described with reference to FIGS. 1-3). Alternative examples of the following may be implemented, where some steps are performed in a different order than described or are not performed at all. In some cases, steps may include additional features not mentioned below, or further steps may be added. In addition, while process flow 400 shows processes between base station 105-*f* and a single UE 115-*c*, it should be understood that these processes may occur between any number of network devices.

At 405, the UE 115-*c* may transition from a connected state to an inactive state (e.g., the UE may transition from RRC_CONNECTED to RRC_INACTIVE). The UE 115-*c* may store information such as the context of base station 105-*f* before transitioning to the inactive state.

At 410, the UE 115-*c* may monitor a first beam associated with an RNA associated with the base station 105-*f* during a first transponder occasion of the inactive state. In some examples, the UE 115-*c* may select the first beam for monitoring from a set of beams of the RNA based on determining that the first beam is a "best" beam for monitoring at a first time (e.g., the first beam is associated with a highest signal strength, beam quality, or other metrics). The first beam may be transmitted by the base station 105-*f*, which may be a serving base station for one or more cells of the RNA.

At 415, the base station 105-*f* may transmit a transponder search signal to the UE 115-*c*, and the UE 115-*c* receives the transponder signal in accordance with a first propagation delay T_prop. The transponder search signal may include a first identifier associated with the RNA. In some examples, the UE 115-*c* may identify a first periodicity for receiving transponder search messages during a one or more transponder occasions, and may monitor the first beam in accordance with the periodicity (e.g., the UE 115-*c* may monitor the first beam during a second transponder occasion of the inactive state in accordance with the first periodicity). In some examples, the first periodicity for receiving transponder search messages may be longer than a second periodicity for receiving paging messages from the network. In some other examples, the first periodicity may be based on a mobility profile of the UE 115-*c*, a power consumption of the UE 115-*c*, or both.

In some examples, the UE 115-*c* may identify the transponder search message based on a correlation property of the transponder search signal, which may allow for detection of the transponder search message using an analog correlation circuit of the UE 115-*c* (e.g., using minimal baseband circuitry). In some cases, the base station 105-*f* may transmit the transponder search message using a beam identified in a previous communication with the UE 115-*c* or based on a last known location of the UE 115-*c*. In some examples, the UE 115-*c* may implement a wake-up receiver to receive the transponder search message, and the wake-up receive may trigger a predefined response sequence as a transponder response message, which may include a UE-specific ID and other metrics. For example, the wake-up receiver may be a lower power for receiving limited-complexity signaling (e.g., a transponder), and the UE 115-*c* may receive, during the first transponder occasion, the one or more transponder search messages at the wake-up receiver of the UE 115-*c*.

At 420, the UE 115-*c* may transmit a transponder response message that includes an identifier associated with the UE. For example, the identifier may be a UE-specific identifier that is associated with the inactive state (e.g., an I-RNTI). In some examples, the UE 115-*c* may determine a transmission beam based on performing a beam sweep of a number of receive beams during transmission of the transponder search message.

The UE 115-*c* may transmit the transponder response in accordance with a gap period T_gap following the reception of the preamble of the transponder search message. In some cases, the UE 115-*c* may transmit the transponder response at a slot boundary. For example, the UE 115-*c* in an inactive state may not be uplink synchronized, and may transmit the transponder response message on a slot boundary of the received transponder search messages. The UE 115-*c* may transmit the transponder response message in the direction of the best or last known base station beam associated with the base station 105-*f*.

In some examples, the transponder response signal may include additional information associated with the UE 115-*c* such as one or more data fields that may indicate measurements of transmission power levels, GPS time signatures or last known network time, frequency and timing lock status, battery status for the UE 115-*c*, operating temperature of the UE 115-*c*, a time since last user interaction, or any combination thereof.

In some examples, the UE 115-*c* may identify a second beam associated with a second base station of the RNA subsequent to the first transponder occasion and prior to a second transponder occasion. For example, the UE 115-*c* may listen for beam swept SSBs transmitted as part of periodic beam sweeps performed by the first base station 105-*f* and the second base station, and may determine a best beam based on comparing one or more measurements of beams transmitted by the first and second base stations. The UE 115-*c* may identify a transponder search message associated with the second beam during the second transponder occasion, and the UE 115-*c* may transmit a transponder response message to the second base station during the second transponder occasion. In some examples, the UE 115-*c* may update its last known cell based on transmitting the transponder response message during the second transponder occasion. In addition, the first base station 105-*f* and second base station may update the last known beams for the UE 115-*c*.

At 425, the base station 105-*f* may identify the inactive state of the UE 115-*c*, and may receive the transponder response signal in accordance with a second propagation delay T_prop. In some examples, the base station 105-*f* may be associated with a cell group (e.g., one or more cells of the RNA), and each of the base stations may listen for the UE transponder response message. The base station 105-*f* may identify the transponder response message using the I-RNTI associated with the UE 115-*c*. In some examples, the base station 105-*f* may receive a number of multiplexed transponder response messages from a number of different UEs (e.g., over the same time-frequency resources), where each transponder response message is associated with a different I-RNTI associated with each UE.

At 425, the base station 105-*f* may perform a number of measurements to determine a relative location of the UE 115-*c* based on receiving the transponder response message. For example, the base station 105-*f* may determine an AoA for the transponder response message based on a receive beam at the base station 105-*f* used to receive the transponder response message. The base station 105-*f* may use the determined AoA to identify a relative direction of the UE 115-*c* with respect to the base station 105-*f* based on the AoA.

The base station 105-*f* may further determine an RTT between transmitting the one or more transponder search messages and receiving the first transponder response message from the UE 115-*c*. For example, the base station may calculate RTT in accordance with: (RTT=T_tx−T_rx− T_gap)=2_xT prop. The base station 105-*c* may use the calculated RTT to determine a relative distance of the UE with respect to the base station 105-*c*.

Figure 5:
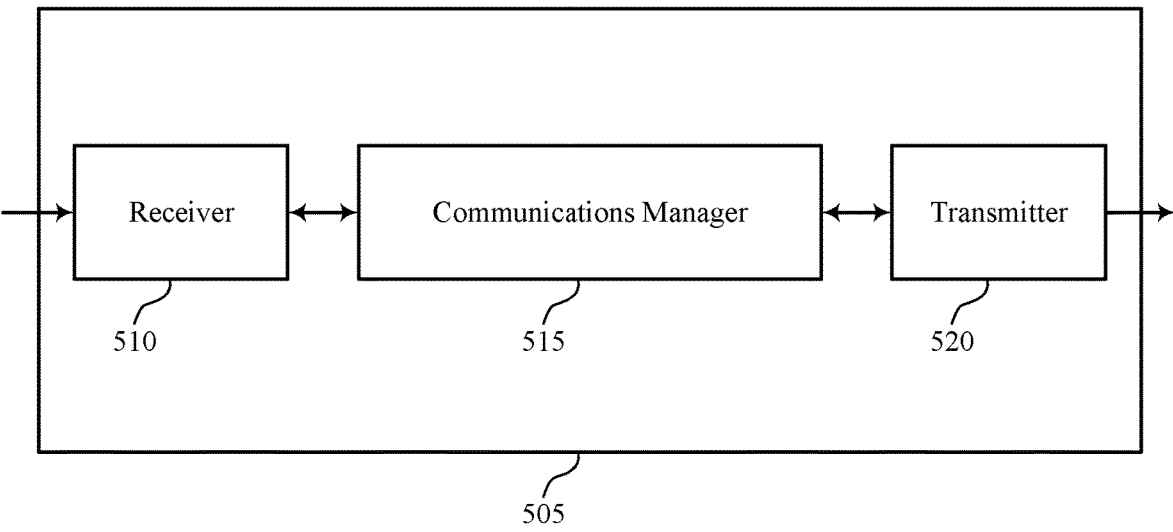
FIGS. 5 and 6 show block diagrams of devices that support transponder signaling for localization on higher bands in accordance with aspects of the present disclosure.

FIG. 5 shows a block diagram 500 of a device 505 that supports transponder signaling for localization on higher bands in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to transponder signaling for localization on higher bands, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a transition of the UE from a connected state to an inactive state, monitor a first beam during a first transponder occasion of the inactive state, where the first beam is associated with a base station of a notification area, receive, during the first transponder occasion, one or more transponder search messages that include a first identifier associated with the notification area, and transmit, to the base station, a first transponder response message including a second identifier associated with the UE. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, communications manager 515 may be implemented as an integrated circuit or chipset for a mobile device modem, and the receiver 510 and transmitter 520 may be implemented as analog components (e.g., amplifiers, filters, and antennas) coupled with the mobile device modem to enable wireless transmission and reception.

The communications manager 515 as described herein may be implemented to realize one or more potential advantages. At least one implementation may enable communications manager 515 to effectively transmit and receive messages associated with a low power transponding mechanism for localizing the device 505 within a wireless communications network. In some other implementations, the communications manager 515 may update a last known cell or beam for the device 505 based on the transponding.

Based on implementing the techniques as described herein, one or more processors of the device 505 (e.g., processor(s) controlling or incorporated with one or more of receiver 510, communications manager 515, and transmitter 520) may effectively improve battery life of the device 505 by increasing the time that the device is in a low-power mode (e.g., an idle or inactive mode). In some other examples, the techniques described may reduce system overhead and complexity by reducing the number of repetitive paging attempts to localize devices in the network.

Figure 6:
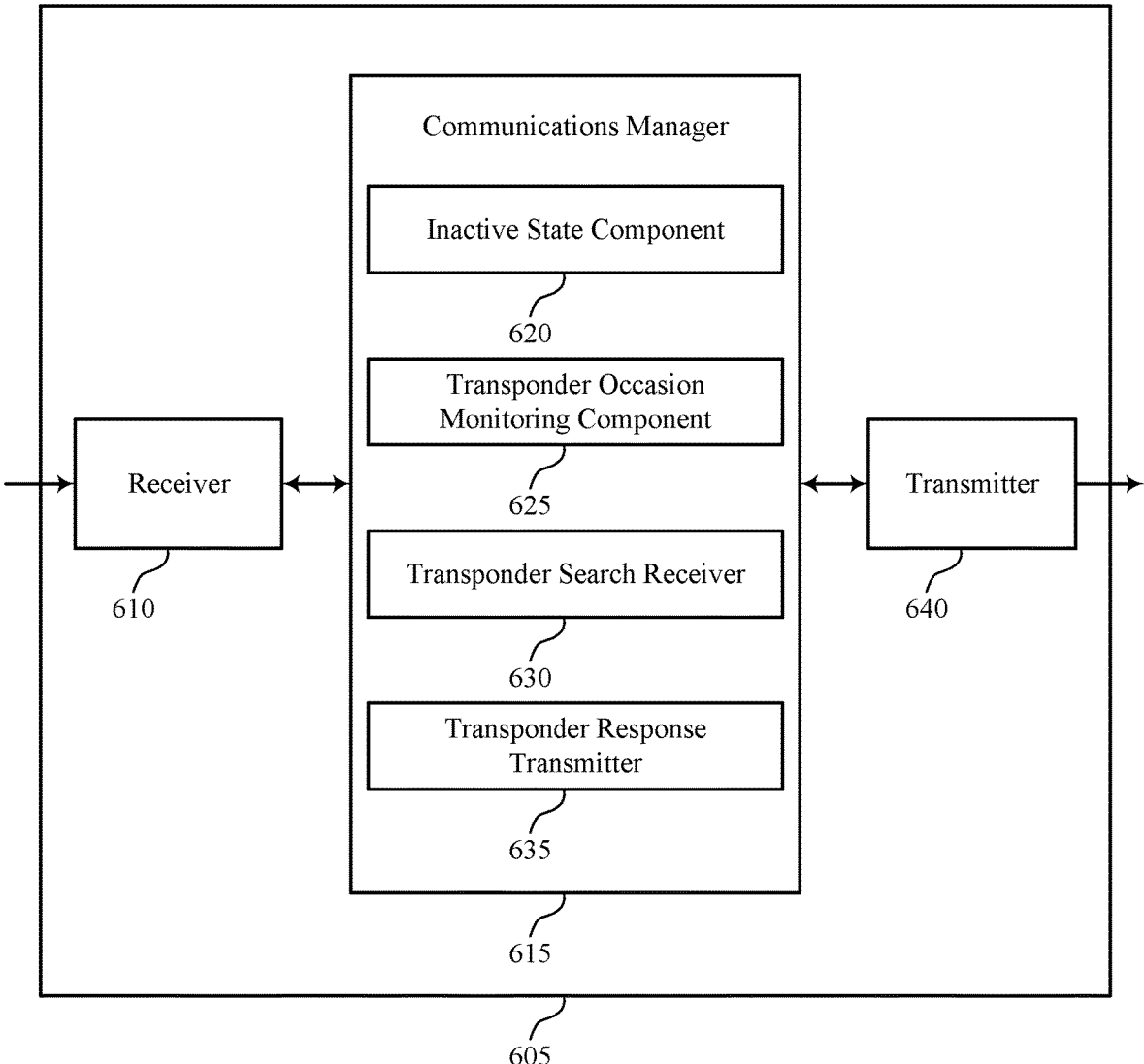

FIG. 6 shows a block diagram 600 of a device 605 that supports transponder signaling for localization on higher bands in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to transponder signaling for localization on higher bands, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an inactive state component 620, a transponder occasion monitoring component 625, a transponder search receiver 630, and a transponder response transmitter 635. The communications manager 615 may be an example of aspects of the communications manager 810 described herein.

The inactive state component 620 may identify a transition of the UE from a connected state to an inactive state.

The transponder occasion monitoring component 625 may monitor a first beam during a first transponder occasion of the inactive state, where the first beam is associated with a base station of a notification area.

The transponder search receiver 630 may receive, during the first transponder occasion, one or more transponder search messages that include a first identifier associated with the notification area.

The transponder response transmitter 635 may transmit, to the base station, a first transponder response message including a second identifier associated with the UE.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
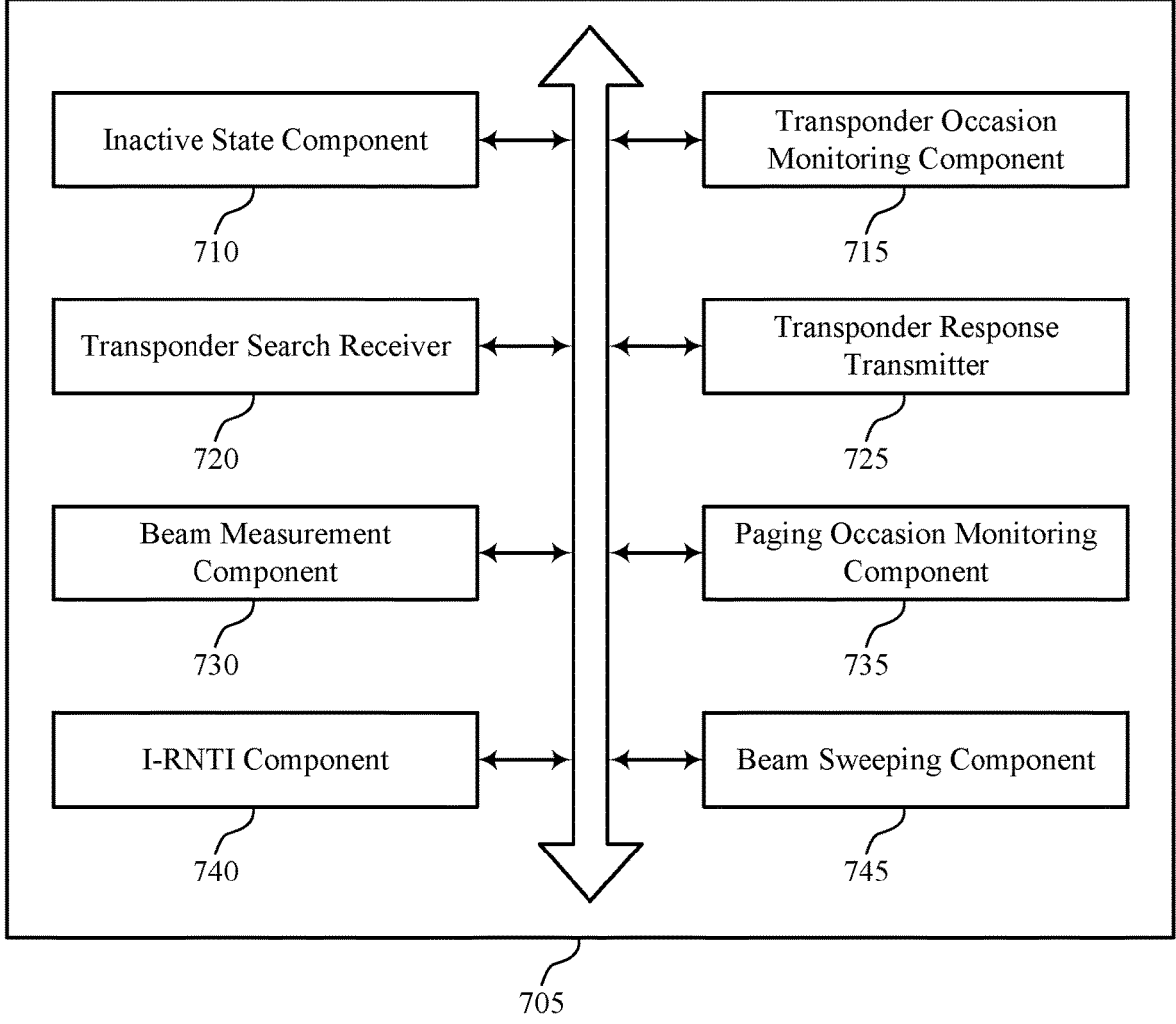
FIG. 7 shows a block diagram of a communications manager that supports transponder signaling for localization on higher bands in accordance with aspects of the present disclosure.

FIG. 7 shows a block diagram 700 of a communications manager 705 that supports transponder signaling for localization on higher bands in accordance with aspects of the present disclosure. The communications manager 705 may be an example of aspects of a communications manager 515, a communications manager 615, or a communications manager 810 described herein. The communications manager 705 may include an inactive state component 710, a transponder occasion monitoring component 715, a transponder search receiver 720, a transponder response transmitter 725, a beam measurement component 730, a paging occasion monitoring component 735, an I-RNTI component 740, and a beam sweeping component 745. Each of these modules may communicate, directly or indirectly, with one another (e.g., via one or more buses).

The inactive state component 710 may identify a transition of the UE from a connected state to an inactive state.

The transponder occasion monitoring component 715 may monitor a first beam during a first transponder occasion of the inactive state, where the first beam is associated with a base station of a notification area. In some examples, the transponder occasion monitoring component 715 may identify a second beam associated with a second base station of the notification area subsequent to the first transponder occasion and prior to a second transponder occasion.

In some examples, the transponder occasion monitoring component 715 may identify a first periodicity for receiving the one or more transponder search messages during a set of transponder occasions associated with the notification area. In some cases, the first periodicity is based on a mobility profile of the UE, power consumption of the UE, or both.

In some examples, the transponder occasion monitoring component 715 may detect the one or more transponder search messages based on a correlation property. The transponder search receiver 720 may receive, during the first transponder occasion, one or more transponder search messages that include a first identifier associated with the notification area. In some examples, the transponder search receiver 720 may receive, during the second transponder occasion, a second one or more transponder search messages including the first identifier.

In some examples, the transponder search receiver 720 may receive, during the first transponder occasion, the one or more transponder search messages at the second receiver of the UE.

In some examples, the transponder response transmitter 725 may transmit the first transponder response message in response to detecting the one or more transponder search messages. In some examples, the first transponder response message may include a one or more data fields for indicating one or more measurements associated with the UE, the one or more measurements comprising a UE transmission power level, timing parameters, battery status of the UE, user interaction history, operating temperature, or any combination thereof. In some examples, the first transponder response message may include one or more data fields for indicating one or more measurements associated with the UE, the one or more measurements comprising a UE transmission power level, timing parameters, battery status of the UE, user interaction history, operating temperature, or any combination thereof. In some examples, the transponder response transmitter 725 may determine a slot boundary based on the one or more transponder search messages. In some examples, the transponder response transmitter 725 may transmit the first transponder response message at the slot boundary.

In some examples, the transponder response transmitter 725 may transmit the first transponder response message at a predetermined time offset from the one or more transponder search messages in response to receiving the one or more transponder search messages. The beam measurement component 730 may compare the first beam and the second beam based on one or more beam measurements of beam sweep signals transmitted by the first base station and the second base station.

The beam sweeping component 745 may perform a beam sweep of a set of receive beams during transmission of the one or more transponder search messages. In some examples, the beam measurement component 730 may select a transmission beam for transmitting the first transponder response message based on the performing the beam sweep.

In some examples, the paging occasion monitoring component 735 may monitor for paging messages during the set of paging occasions according to the first beam. In some examples, the transponder occasion monitoring component 715 may monitor the first beam during a second transponder occasion of the inactive state in accordance with a first periodicity. The paging occasion monitoring component 735 may identify a second periodicity for receiving one or more paging messages during a set of paging occasions, where the second periodicity for receiving the one or more paging messages is shorter than the first periodicity for receiving the one or more transponder search messages.

The transponder response transmitter 725 may transmit, to the base station, a first transponder response message including a second identifier associated with the UE. The I-RNTI component 740 may determine that the second identifier of the first transponder response message includes a radio network temporary identifier associated with the inactive state of the UE. In some examples, the transponder response transmitter 725 may transmit, to the second base station, a second transponder response message including the second identifier.

Figure 8:
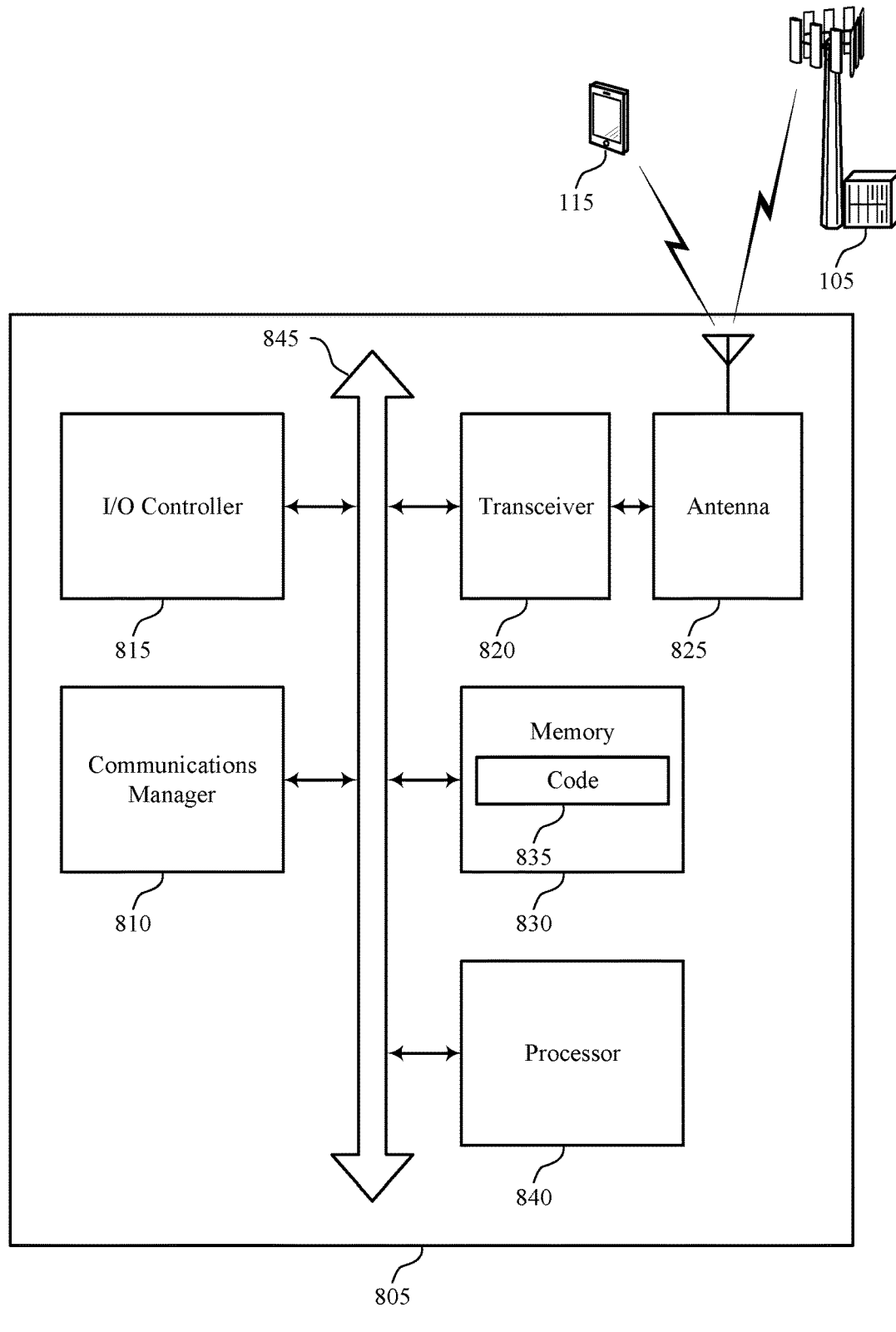
FIG. 8 shows a diagram of a system including a device that supports transponder signaling for localization on higher bands in accordance with aspects of the present disclosure.

FIG. 8 shows a diagram of a system 800 including a device 805 that supports transponder signaling for localization on higher bands in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a transition of the UE from a connected state to an inactive state, monitor a first beam during a first transponder occasion of the inactive state, where the first beam is associated with a base station of a notification area, receive, during the first transponder occasion, one or more transponder search messages that include a first identifier associated with the notification area, and transmit, to the base station, a first transponder response message including a second identifier associated with the UE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting transponder signaling for localization on higher bands).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
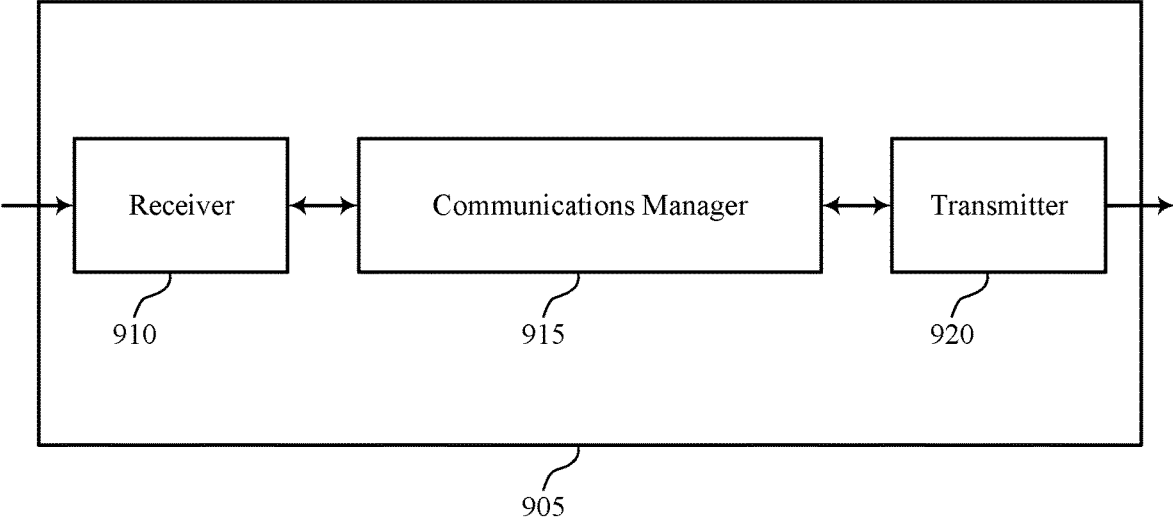
FIGS. 9 and 10 show block diagrams of devices that support transponder signaling for localization on higher bands in accordance with aspects of the present disclosure.

FIG. 9 shows a block diagram 900 of a device 905 that supports transponder signaling for localization on higher bands in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to transponder signaling for localization on higher bands, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a transition of a UE from a connected state to an inactive state, transmit, during a first transponder occasion, a transponder search message that includes an identifier associated with a notification area of the base station via a first beam, receive a first transponder response message including a second identifier associated with the UE, and determine a location of the UE based on the first transponder response message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
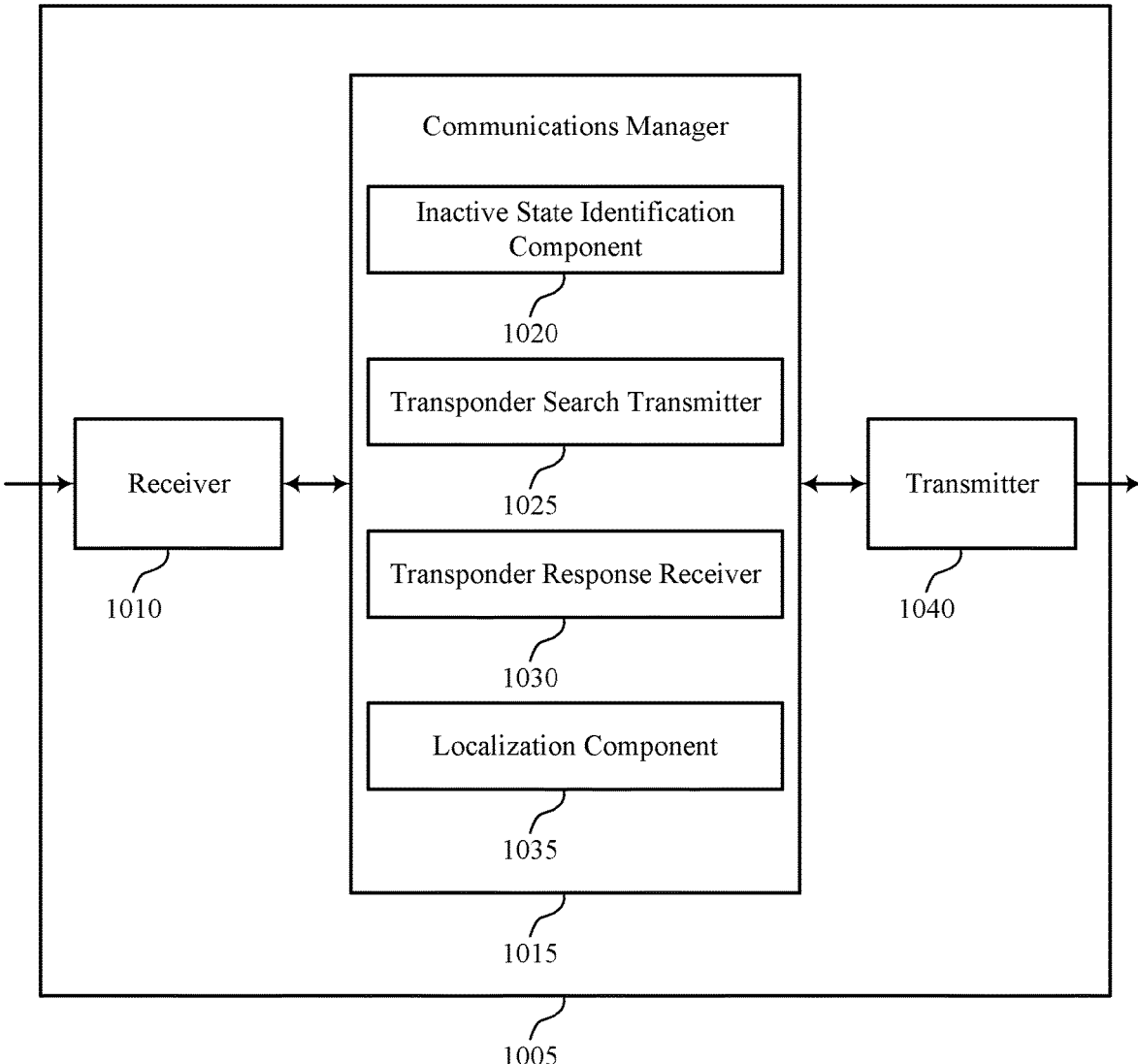

FIG. 10 shows a block diagram 1000 of a device 1005 that supports transponder signaling for localization on higher bands in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to transponder signaling for localization on higher bands, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an inactive state identification component 1020, a transponder search transmitter 1025, a transponder response receiver 1030, and a localization component 1035. The communications manager 1015 may be an example of aspects of the communications manager 1210 described herein.

The inactive state identification component 1020 may identify a transition of a UE from a connected state to an inactive state.

The transponder search transmitter 1025 may transmit, during a first transponder occasion, a transponder search message that includes an identifier associated with a notification area of the base station via a first beam.

The transponder response receiver 1030 may receive a first transponder response message including a second identifier associated with the UE.

The localization component 1035 may determine a location of the UE based on the first transponder response message.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

In some examples, communications manager 1015 may be implemented as an integrated circuit or chipset for a mobile device modem, and the receiver 1010 and transmitter 1020 may be implemented as analog components (e.g., amplifiers, filters, and antennas) coupled with the mobile device modem to enable wireless transmission and reception.

The communications manager 1015 as described herein may be implemented to realize one or more potential advantages. At least one implementation may enable communications manager 1015 to effectively transmit and receive messages associated with a low power transponding mechanism for localizing the device 1005 within a wireless communications network. In some other implementations, the communications manager 1015 may update a last known cell or beam for the device 1005 based on the transponding, and may perform calculations to determine an up-to-date location of the device 1005.

Based on implementing the techniques as described herein, one or more processors of the device 1005 (e.g., processor(s) controlling or incorporated with one or more of receiver 1010, communications manager 1015, and transmitter 1020) may effectively improve battery life of the device 1005 by increasing the time that the device is in a low-power mode (e.g., an idle or inactive mode). In some other examples, the techniques described may reduce system overhead and complexity by reducing the number of repetitive paging attempts to localize devices in the network, among other advantages.

Figure 11:
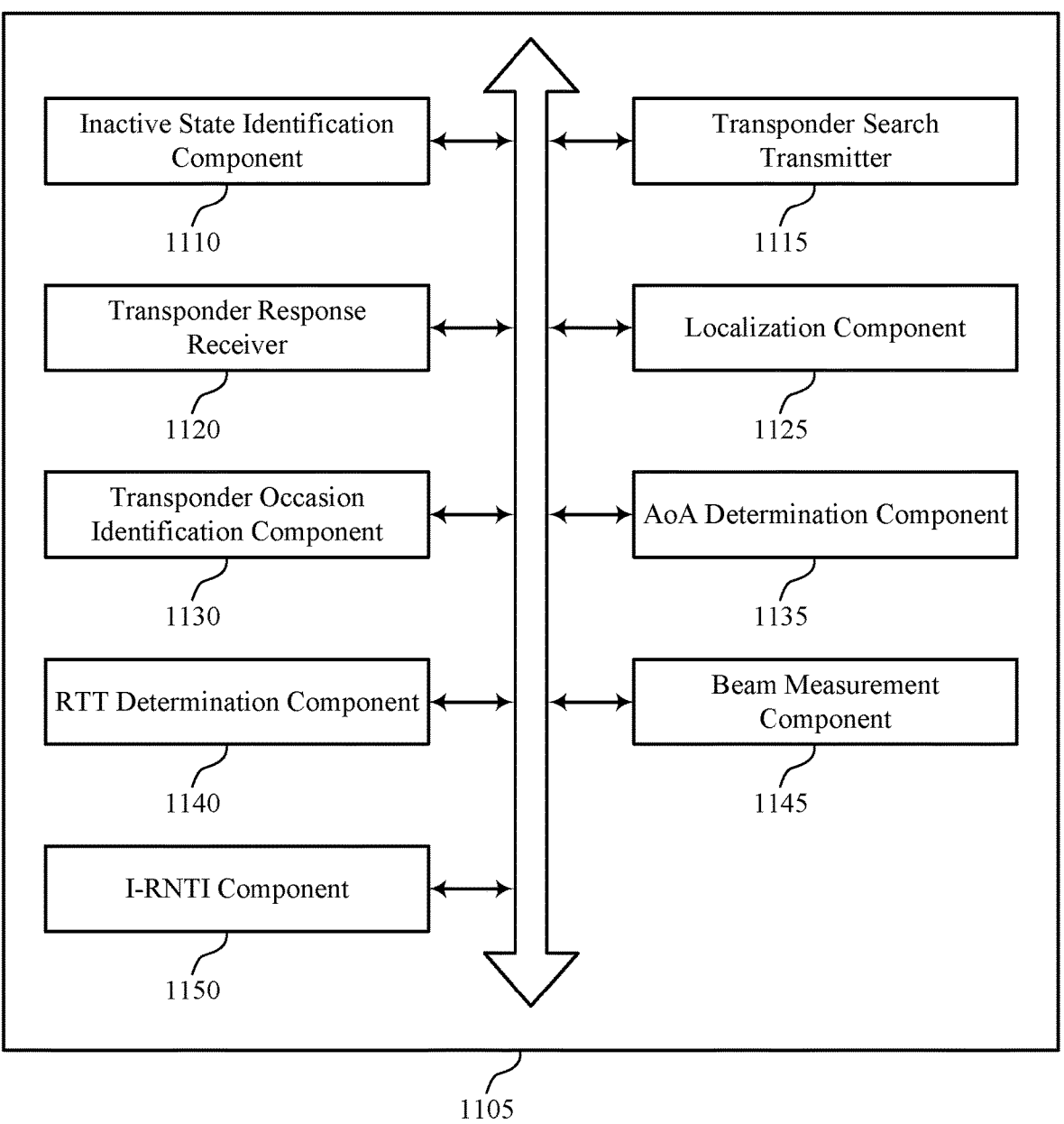
FIG. 11 shows a block diagram of a communications manager that supports transponder signaling for localization on higher bands in accordance with aspects of the present disclosure.

FIG. 11 shows a block diagram 1100 of a communications manager 1105 that supports transponder signaling for localization on higher bands in accordance with aspects of the present disclosure. The communications manager 1105 may be an example of aspects of a communications manager 915, a communications manager 1015, or a communications manager 1210 described herein. The communications manager 1105 may include an inactive state identification component 1110, a transponder search transmitter 1115, a transponder response receiver 1120, a localization component 1125, a transponder occasion identification component 1130, an AoA determination component 1135, a RTT determination component 1140, a beam measurement component 1145, and an I-RNTI component 1150. Each of these modules may communicate, directly or indirectly, with one another (e.g., via one or more buses).

The inactive state identification component 1110 may identify a transition of a UE from a connected state to an inactive state.

The transponder search transmitter 1115 may transmit, during a first transponder occasion, a transponder search message that includes an identifier associated with a notification area of the base station via a first beam. In some cases, the transponder search message is associated with a correlation property for detection using an analog correlation circuit.

The transponder response receiver 1120 may receive a first transponder response message including a second identifier associated with the UE. In some examples, the transponder response receiver 1120 may receive, during a first paging occasion, an indication of a location of the UE based on the first transponder response message.

In some examples, the transponder response receiver 1120 may receive the first transponder response message multiplexed with one or more other transponder response messages from one or more additional UEs based on the radio network temporary identifier. In some examples, the transponder response receiver 1120 may monitor for the first transponder response message at a predetermined offset from the transponder search message.

The localization component 1125 may determine a location of the UE based on the first transponder response message. In some examples, the transponder search transmitter 1115 may transmit the transponder search message in each of the set of transponder occasions accordance with a first periodicity. In some examples, the transponder search transmitter 1115 may transmit the one or more paging messages based on a second periodicity.

The transponder occasion identification component 1130 may identify a first periodicity for a set of transponder occasions associated with the notification area, the set of transponder occasions including the first transponder occasion. In some cases, the first periodicity is based on a mobility profile of the UE, power consumption of the UE, or both.

In some examples, the transponder occasion identification component 1130 may identify a second periodicity for transmitting one or more paging messages during a set of paging occasions, where the second periodicity for transmitting the one or more paging messages is longer than the first periodicity for transmitting the one or more transponder search messages.

The AoA determination component 1135 may determine an angle of arrival of a first beam associated with receiving the first transponder response message. In some examples, the AoA determination component 1135 may determine a relative direction of the UE with respect to the base station based on the angle of arrival of the first beam.

The RTT determination component 1140 may determine a round-trip time between transmitting the one or more transponder search messages and receiving the first transponder response message. In some examples, the RTT determination component 1140 may determine a relative distance of the UE with respect to the base station based on the round-trip timing.

The beam measurement component 1145 may identify the first beam based on a prior communication with the UE. In some examples, the beam measurement component 1145 may identify the first beam based on a prior communication of a second base station with the UE or a last known location of the UE.

The I-RNTI component 1150 may determine that the second identifier of the first transponder response message includes a radio network temporary identifier associated with the inactive state of the UE.

Figure 12:
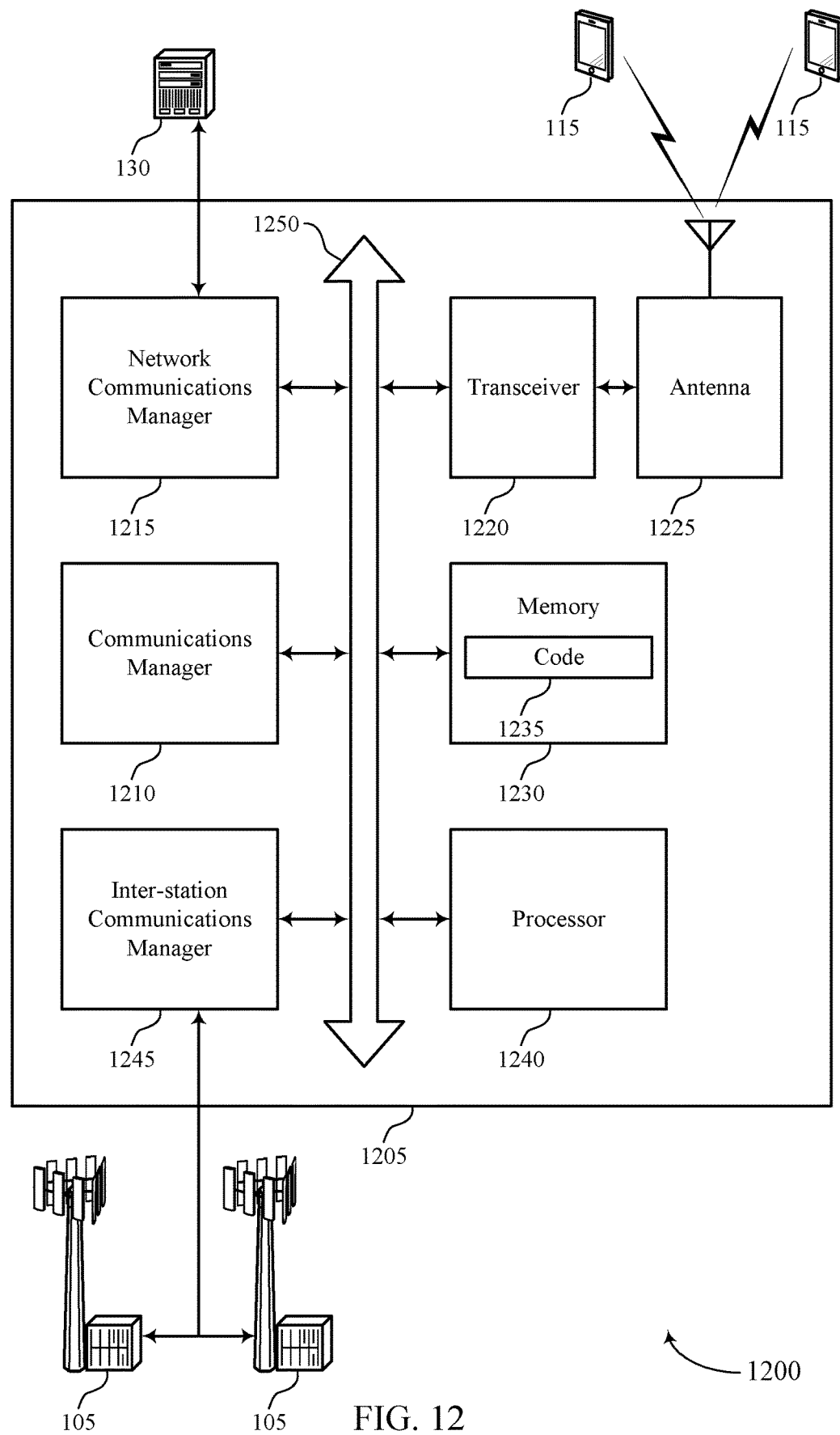
FIG. 12 shows a diagram of a system including a device that supports transponder signaling for localization on higher bands in accordance with aspects of the present disclosure.

FIG. 12 shows a diagram of a system 1200 including a device 1205 that supports transponder signaling for localization on higher bands in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a transition of a UE from a connected state to an inactive state, transmit, during a first transponder occasion, a transponder search message that includes an identifier associated with a notification area of the base station via a first beam, receive a first transponder response message including a second identifier associated with the UE, and determine a location of the UE based on the first transponder response message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting transponder signaling for localization on higher bands).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports transponder signaling for localization on higher bands in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a transition of the UE from a connected state to an inactive state. The operations of 1305 may be performed according to the methods described herein. In some examples, aspects of the operations of 1305 may be performed by an inactive state component as described with reference to FIGS. 5 through 8.

At 1310, the UE may monitor a first beam during a first transponder occasion of the inactive state, where the first beam is associated with a base station of a notification area. The operations of 1310 may be performed according to the methods described herein. In some examples, aspects of the operations of 1310 may be performed by a transponder occasion monitoring component as described with reference to FIGS. 5 through 8.

At 1315, the UE may receive, during the first transponder occasion, one or more transponder search messages that include a first identifier associated with the notification area. The operations of 1315 may be performed according to the methods described herein. In some examples, aspects of the operations of 1315 may be performed by a transponder search receiver as described with reference to FIGS. 5 through 8.

At 1320, the UE may transmit, to the base station, a first transponder response message including a second identifier associated with the UE. The operations of 1320 may be performed according to the methods described herein. In some examples, aspects of the operations of 1320 may be performed by a transponder response transmitter as described with reference to FIGS. 5 through 8.

FIG. 14 shows a flowchart illustrating a method 1400 that supports transponder signaling for localization on higher bands in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a transition of the UE from a connected state to an inactive state. The operations of 1405 may be performed according to the methods described herein. In some examples, aspects of the operations of 1405 may be performed by an inactive state component as described with reference to FIGS. 5 through 8.

At 1410, the UE may monitor a first beam during a first transponder occasion of the inactive state, where the first beam is associated with a base station of a notification area. The operations of 1410 may be performed according to the methods described herein. In some examples, aspects of the operations of 1410 may be performed by a transponder occasion monitoring component as described with reference to FIGS. 5 through 8.

At 1415, the UE may receive, during the first transponder occasion, one or more transponder search messages that include a first identifier associated with the notification area. The operations of 1415 may be performed according to the methods described herein. In some examples, aspects of the operations of 1415 may be performed by a transponder search receiver as described with reference to FIGS. 5 through 8.

At 1420, the UE may transmit, to the base station, a first transponder response message including a second identifier associated with the UE. The operations of 1420 may be performed according to the methods described herein. In some examples, aspects of the operations of 1420 may be performed by a transponder response transmitter as described with reference to FIGS. 5 through 8.

At 1425, the UE may identify a second beam associated with a second base station of the notification area subsequent to the first transponder occasion and prior to a second transponder occasion. The operations of 1425 may be performed according to the methods described herein. In some examples, aspects of the operations of 1425 may be performed by a transponder occasion monitoring component as described with reference to FIGS. 5 through 8.

At 1430, the UE may receive, during the second transponder occasion, a second one or more transponder search messages including the first identifier. The operations of 1430 may be performed according to the methods described herein. In some examples, aspects of the operations of 1430 may be performed by a transponder search receiver as described with reference to FIGS. 5 through 8.

At 1435, the UE may transmit, to the second base station, a second transponder response message including the second identifier. The operations of 1435 may be performed according to the methods described herein. In some examples, aspects of the operations of 1435 may be performed by a transponder response transmitter as described with reference to FIGS. 5 through 8.

Figure 15:
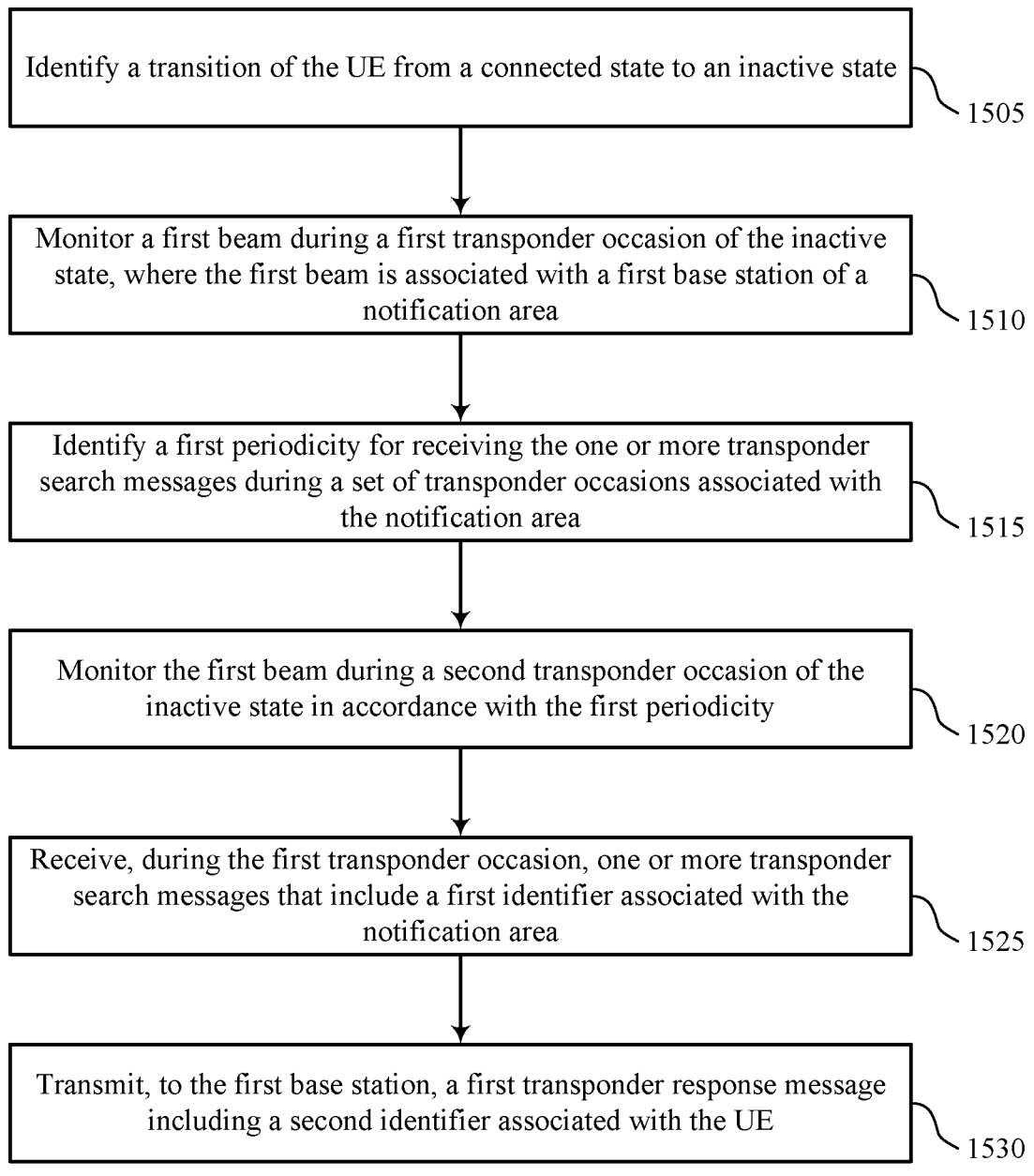

FIG. 15 shows a flowchart illustrating a method 1500 that supports transponder signaling for localization on higher bands in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a transition of the UE from a connected state to an inactive state. The operations of 1505 may be performed according to the methods described herein. In some examples, aspects of the operations of 1505 may be performed by an inactive state component as described with reference to FIGS. 5 through 8.

At 1510, the UE may monitor a first beam during a first transponder occasion of the inactive state, where the first beam is associated with a base station of a notification area. The operations of 1510 may be performed according to the methods described herein. In some examples, aspects of the operations of 1510 may be performed by a transponder occasion monitoring component as described with reference to FIGS. 5 through 8.

At 1515, the UE may identify a first periodicity for receiving the one or more transponder search messages during a set of transponder occasions associated with the notification area. The operations of 1515 may be performed according to the methods described herein. In some examples, aspects of the operations of 1515 may be performed by a transponder occasion monitoring component as described with reference to FIGS. 5 through 8.

At 1520, the UE may monitor the first beam during a second transponder occasion of the inactive state in accordance with the first periodicity. The operations of 1520 may be performed according to the methods described herein. In some examples, aspects of the operations of 1520 may be performed by a transponder occasion monitoring component as described with reference to FIGS. 5 through 8.

At 1525, the UE may receive, during the first transponder occasion, one or more transponder search messages that include a first identifier associated with the notification area. The operations of 1525 may be performed according to the methods described herein. In some examples, aspects of the operations of 1525 may be performed by a transponder search receiver as described with reference to FIGS. 5 through 8.

At 1530, the UE may transmit, to the base station, a first transponder response message including a second identifier associated with the UE. The operations of 1530 may be performed according to the methods described herein. In some examples, aspects of the operations of 1530 may be performed by a transponder response transmitter as described with reference to FIGS. 5 through 8.

FIG. 16 shows a flowchart illustrating a method 1600 that supports transponder signaling for localization on higher bands in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify a transition of the UE from a connected state to an inactive state. The operations of 1605 may be performed according to the methods described herein. In some examples, aspects of the operations of 1605 may be performed by an inactive state component as described with reference to FIGS. 5 through 8.

At 1610, the UE may monitor a first beam during a first transponder occasion of the inactive state, where the first beam is associated with a base station of a notification area. The operations of 1610 may be performed according to the methods described herein. In some examples, aspects of the operations of 1610 may be performed by a transponder occasion monitoring component as described with reference to FIGS. 5 through 8.

At 1615, the UE may receive, during the first transponder occasion, one or more transponder search messages that include a first identifier associated with the notification area. The operations of 1615 may be performed according to the methods described herein. In some examples, aspects of the operations of 1615 may be performed by a transponder search receiver as described with reference to FIGS. 5 through 8.

At 1620, the UE may detect the one or more transponder search messages based on a correlation property. The operations of 1620 may be performed according to the methods described herein. In some examples, aspects of the operations of 1620 may be performed by a transponder occasion monitoring component as described with reference to FIGS. 5 through 8.

At 1625, the UE may transmit, to the base station, a first transponder response message including a second identifier associated with the UE. The operations of 1625 may be performed according to the methods described herein. In some examples, aspects of the operations of 1625 may be performed by a transponder response transmitter as described with reference to FIGS. 5 through 8.

At 1630, the UE may transmit the first transponder response message in response to detecting the one or more transponder search messages. The operations of 1630 may be performed according to the methods described herein. In some examples, aspects of the operations of 1630 may be performed by a transponder response transmitter as described with reference to FIGS. 5 through 8.

FIG. 17 shows a flowchart illustrating a method 1700 that supports transponder signaling for localization on higher bands in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a transition of a UE from a connected state to an inactive state. The operations of 1705 may be performed according to the methods described herein. In some examples, aspects of the operations of 1705 may be performed by an inactive state identification component as described with reference to FIGS. 9 through 12.

At 1710, the base station may transmit, during a first transponder occasion, a transponder search message that includes an identifier associated with a notification area of the base station via a first beam. The operations of 1710 may be performed according to the methods described herein. In some examples, aspects of the operations of 1710 may be performed by a transponder search transmitter as described with reference to FIGS. 9 through 12.

At 1715, the base station may receive a first transponder response message including a second identifier associated with the UE. The operations of 1715 may be performed according to the methods described herein. In some examples, aspects of the operations of 1715 may be performed by a transponder response receiver as described with reference to FIGS. 9 through 12.

At 1720, the base station may determine a location of the UE based on the first transponder response message. The operations of 1720 may be performed according to the methods described herein. In some examples, aspects of the operations of 1720 may be performed by a localization component as described with reference to FIGS. 9 through 12.

Figure 18:
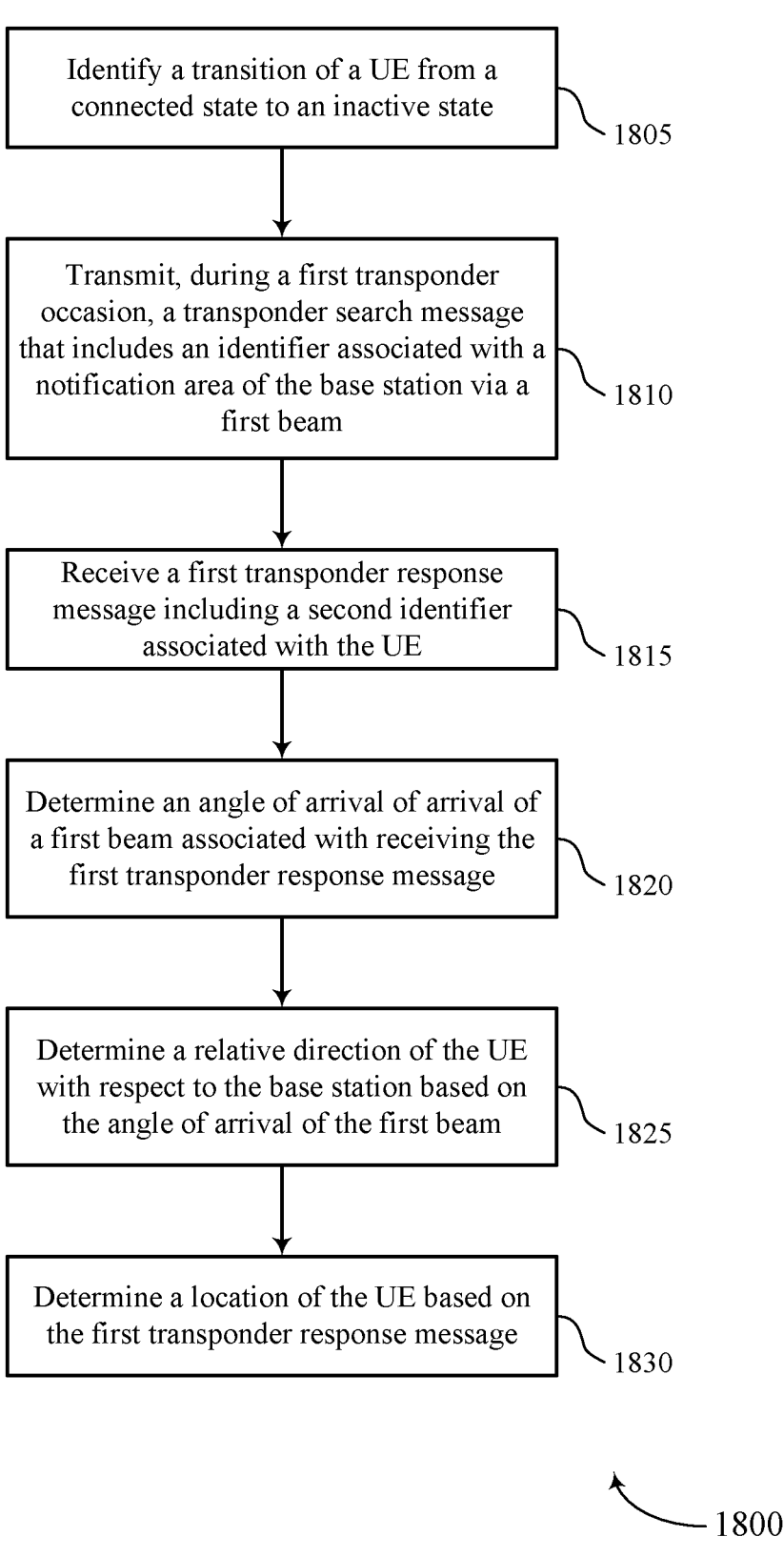

FIG. 18 shows a flowchart illustrating a method 1800 that supports transponder signaling for localization on higher bands in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify a transition of a UE from a connected state to an inactive state. The operations of 1805 may be performed according to the methods described herein. In some examples, aspects of the operations of 1805 may be performed by an inactive state identification component as described with reference to FIGS. 9 through 12.

At 1810, the base station may transmit, during a first transponder occasion, a transponder search message that includes an identifier associated with a notification area of the base station via a first beam. The operations of 1810 may be performed according to the methods described herein. In some examples, aspects of the operations of 1810 may be performed by a transponder search transmitter as described with reference to FIGS. 9 through 12.

At 1815, the base station may receive a first transponder response message including a second identifier associated with the UE. The operations of 1815 may be performed according to the methods described herein. In some examples, aspects of the operations of 1815 may be performed by a transponder response receiver as described with reference to FIGS. 9 through 12.

At 1820, the base station may determine an angle of arrival of a first beam associated with receiving the first transponder response message. The operations of 1820 may be performed according to the methods described herein. In some examples, aspects of the operations of 1820 may be performed by an AoA determination component as described with reference to FIGS. 9 through 12.

At 1825, the base station may determine a relative direction of the UE with respect to the base station based on the angle of arrival of the first beam. The operations of 1825 may be performed according to the methods described herein. In some examples, aspects of the operations of 1825 may be performed by an AoA determination component as described with reference to FIGS. 9 through 12.

At 1830, the base station may determine a location of the UE based on the first transponder response message. The operations of 1830 may be performed according to the methods described herein. In some examples, aspects of the operations of 1830 may be performed by a localization component as described with reference to FIGS. 9 through 12.

FIG. 19 shows a flowchart illustrating a method 1900 that supports transponder signaling for localization on higher bands in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may identify a transition of a UE from a connected state to an inactive state. The operations of 1905 may be performed according to the methods described herein. In some examples, aspects of the operations of 1905 may be performed by an inactive state identification component as described with reference to FIGS. 9 through 12.

At 1910, the base station may transmit, during a first transponder occasion, a transponder search message that includes an identifier associated with a notification area of the base station via a first beam. The operations of 1910 may be performed according to the methods described herein. In some examples, aspects of the operations of 1910 may be performed by a transponder search transmitter as described with reference to FIGS. 9 through 12.

At 1915, the base station may receive a first transponder response message including a second identifier associated with the UE. The operations of 1915 may be performed according to the methods described herein. In some examples, aspects of the operations of 1915 may be performed by a transponder response receiver as described with reference to FIGS. 9 through 12.

At 1920, the base station may determine a round-trip time between transmitting the one or more transponder search messages and receiving the first transponder response message. The operations of 1920 may be performed according to the methods described herein. In some examples, aspects of the operations of 1920 may be performed by an RTT determination component as described with reference to FIGS. 9 through 12.

At 1925, the base station may determine a relative distance of the UE with respect to the base station based on the round-trip timing. The operations of 1925 may be performed according to the methods described herein. In some examples, aspects of the operations of 1925 may be performed by an RTT determination component as described with reference to FIGS. 9 through 12.

At 1930, the base station may determine a location of the UE based on the first transponder response message. The operations of 1930 may be performed according to the methods described herein. In some examples, aspects of the operations of 1930 may be performed by a localization component as described with reference to FIGS. 9 through 12.

The following provides an overview of aspects of the present disclosure:

Aspect 1: A method for wireless communications at a UE, comprising: identifying a transition of the UE from a connected state to an inactive state; monitoring a first beam during a first transponder occasion of the inactive state, wherein the first beam is associated with a first base station of a notification area; receiving, during the first transponder occasion, one or more transponder search messages that comprise a first identifier associated with the notification area; and transmitting, to the first base station, a first transponder response message comprising a second identifier associated with the UE.

Aspect 2: The method of aspect 1, further comprising: identifying a second beam associated with a second base station of the notification area subsequent to the first transponder occasion and prior to a second transponder occasion; receiving, during the second transponder occasion, a second one or more transponder search messages comprising the first identifier; and transmitting, to the second base station, a second transponder response message comprising the second identifier.

Aspect 3: The method of aspect 2, wherein identifying the second beam further comprises: comparing the first beam and the second beam based at least in part on one or more beam measurements of beam sweep signals transmitted by the first base station and the second base station.

Aspect 4: The method of any of aspects 1 through 3, further comprising: identifying a first periodicity for receiving the one or more transponder search messages during a plurality of transponder occasions associated with the notification area; and monitoring the first beam during a second transponder occasion of the inactive state in accordance with the first periodicity.

Aspect 5: The method of aspect 4, further comprising: identifying a second periodicity for receiving one or more paging messages during a plurality of paging occasions, wherein the second periodicity for receiving the one or more paging messages is shorter than the first periodicity for receiving the one or more transponder search messages; and monitoring for paging messages during the plurality of paging occasions according to the first beam.

Aspect 6: The method of any of aspects 4 through 5, wherein the first periodicity is based at least in part on a mobility profile of the UE, power consumption of the UE, or both.

Aspect 7: The method of any of aspects 1 through 6, further comprising: detecting the one or more transponder search messages based at least in part on a correlation property; and transmitting the first transponder response message in response to detecting the one or more transponder search messages.

Aspect 8: The method of any of aspects 1 through 7, wherein the first transponder response message comprises one or more data fields for indicating one or more measurements associated with the UE, the one or more measurements comprising a UE transmission power level, timing parameters, battery status of the UE, user interaction history, operating temperature, or any combination thereof.

Aspect 9: The method of any of aspects 1 through 8, wherein the second identifier of the first transponder response message comprises a radio network temporary identifier associated with the inactive state of the UE.

Aspect 10: The method of any of aspects 1 through 9, wherein receiving the one or more transponder search messages comprises: performing a beam sweep of a plurality of receive beams during transmission of the one or more transponder search messages; and selecting a transmission beam for transmitting the first transponder response message based at least in part on the performing the beam sweep.

Aspect 11: The method of any of aspects 1 through 10, wherein the UE comprises a first receiver operating at a first power for receiving control and data channel transmissions from the first base station and a second receiver operating at a second, lower power for receiving limited-complexity signaling, the method further comprising: receiving, during the first transponder occasion, the one or more transponder search messages at the second receiver of the UE.

Aspect 12: The method of any of aspects 1 through 11, further comprising: determining a slot boundary based at least in part on the one or more transponder search messages; and transmitting the first transponder response message at the slot boundary.

Aspect 13: The method of claim any of aspects 1 through 11 further comprising: transmitting the first transponder response message at a predetermined time offset from the one or more transponder search messages in response to receiving the one or more transponder search messages.

Aspect 14: A method for wireless communications at a base station, comprising: identifying a transition of a UE from a connected state to an inactive state; transmitting, during a first transponder occasion, a transponder search message that comprises an identifier associated with a notification area of the base station via a first beam; receiving a first transponder response message comprising a second identifier associated with the UE; and determining a location of the UE based at least in part on the first transponder response message.

Aspect 15: The method of aspect 14, further comprising: identifying a first periodicity for a plurality of transponder occasions associated with the notification area, the plurality of transponder occasions comprising the first transponder occasion; and transmitting the transponder search message in each of the plurality of transponder occasions in accordance with the first periodicity.

Aspect 16: The method of aspect 15, further comprising: identifying a second periodicity for transmitting one or more paging messages during a plurality of paging occasions, wherein the second periodicity for transmitting the one or more paging messages is longer than the first periodicity for transmitting the transponder search message; transmitting the one or more paging messages based at least in part on the second periodicity; and receiving, during a first paging occasion, an indication of a location of the UE based at least in part on the transponder response message.

Aspect 17: The method of any of aspects 15 through 16, wherein the first periodicity is based at least in part on a mobility profile of the UE, power consumption of the UE, or both.

Aspect 18: The method of any of aspects 14 through 17, wherein determining the location of the UE further comprises: determining an angle of arrival of the first beam associated with receiving the first transponder response message; and determining a relative direction of the UE with respect to the base station based at least in part on the angle of arrival of the first beam.

Aspect 19: The method of any of aspects 14 through 18, further comprising: determining a round-trip time between transmitting the transponder search message and receiving the first transponder response message; and determining a relative distance of the UE with respect to the base station based at least in part on the round-trip time.

Aspect 20: The method of any of aspects 14 through 19, wherein the transponder search message is associated with a correlation property for detection using an analog correlation circuit.

Aspect 21: The method of any of aspects 14 through 20, further comprising: identifying the first beam based at least in part on a prior communication with the UE.

Aspect 22: The method of any of aspects 14 through 21, further comprising: identifying the first beam based at least in part on a prior communication of a second base station with the UE or a last known location of the UE.

Aspect 23: The method of any of aspects 14 through 22, wherein the second identifier of the first transponder response message comprises a radio network temporary identifier associated with the inactive state of the UE.

Aspect 24: The method of aspect 23, further comprising: receiving the first transponder response message multiplexed with one or more other transponder response messages from one or more additional UEs based at least in part on the radio network temporary identifier.

Aspect 25: The method of any of aspects 14 through 24, wherein the first transponder response message comprises one or more data fields for indicating one or more measurements associated with the UE, the one or more measurements comprising a UE transmission power level, timing and frequency parameters, battery status of the UE, user interaction history, operating temperature, or any combination thereof.

Aspect 26: The method of any of aspects 14 through 25, further comprising: monitoring for the first transponder response message at a predetermined offset from the transponder search message.

Aspect 27: An apparatus for wireless communications at a UE, comprising a processor; memory coupled with the processor; and instructions stored in the memory and executable by the processor to cause the apparatus to perform a method of any of aspects 1 through 12.

Aspect 28: An apparatus for wireless communications at a UE, comprising at least one means for performing a method of any of aspects 1 through 12.

Aspect 29: A non-transitory computer-readable medium storing code for wireless communications at a UE, the code comprising instructions executable by a processor to perform a method of any of aspects 1 through 12.

Aspect 30: An apparatus comprising a processor; memory coupled with the processor; and instructions stored in the memory and executable by the processor to cause the apparatus to perform a method of any of aspects 13 through 13.

Aspect 31: An apparatus comprising at least one means for performing a method of any of aspects 13 through 13.

Aspect 32: A non-transitory computer-readable medium storing code the code comprising instructions executable by a processor to perform a method of any of aspects 13 through 13.

Aspect 33: An apparatus for wireless communications at a base station, comprising a processor; memory coupled with the processor; and instructions stored in the memory and executable by the processor to cause the apparatus to perform a method of any of aspects 14 through 26.

Aspect 34: An apparatus for wireless communications at a base station, comprising at least one means for performing a method of any of aspects 14 through 26.

Aspect 35: A non-transitory computer-readable medium storing code for wireless communications at a base station, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a base station, comprising:

identifying a transition of a user equipment (UE) from a connected state to an inactive state;

transmitting, during a first transponder occasion, a transponder search message that comprises an identifier associated with a notification area of the base station via a first beam;

receiving a first transponder response message comprising a second identifier associated with the UE;

determining a location of the UE based at least in part on the first transponder response message;

identifying a first periodicity for a plurality of transponder occasions associated with the notification area, the plurality of transponder occasions comprising the first transponder occasion; and transmitting the transponder search message in each of the plurality of transponder occasions in accordance with the first periodicity.

2. The method of claim 1, further comprising:

identifying a second periodicity for transmitting one or more paging messages during a plurality of paging occasions, wherein the second periodicity for transmitting the one or more paging messages is longer than the first periodicity for transmitting the transponder search message;

transmitting the one or more paging messages based at least in part on the second periodicity; and receiving, during a first paging occasion, an indication of the location of the UE based at least in part on the first transponder response message.

3. The method of claim 1, wherein the first periodicity is based at least in part on a mobility profile of the UE, power consumption of the UE, or both.

4. The method of claim 1, wherein determining the location of the UE further comprises:

determining an angle of arrival of the first beam associated with receiving the first transponder response message; and determining a relative direction of the UE with respect to the base station based at least in part on the angle of arrival of the first beam.

5. The method of claim 1, further comprising:

determining a round-trip time between transmitting the transponder search message and receiving the first transponder response message; and determining a relative distance of the UE with respect to the base station based at least in part on the round-trip time.

6. The method of claim 1, wherein the transponder search message is associated with a correlation property for detection using an analog correlation circuit.

7. The method of claim 1, further comprising:

identifying the first beam based at least in part on a prior communication with the UE.

8. The method of claim 1, further comprising:

identifying the first beam based at least in part on a prior communication of a second base station with the UE or a last known location of the UE.

9. The method of claim 1, wherein the second identifier of the first transponder response message comprises a radio network temporary identifier associated with the inactive state of the UE.

10. The method of claim 9, further comprising:

receiving the first transponder response message multiplexed with one or more other transponder response messages from one or more additional UEs based at least in part on the radio network temporary identifier.

11. The method of claim 1, wherein the first transponder response message comprises one or more data fields for indicating one or more measurements associated with the UE, the one or more measurements comprising a UE transmission power level, timing and frequency parameters, battery status of the UE, user interaction history, operating temperature, or any combination thereof.

12. The method of claim 1, further comprising:

monitoring for the first transponder response message at a predetermined offset from the transponder search message.

13. An apparatus for wireless communications at a base station, comprising:

one or more processors; and one or more memories coupled with the one or more processors, the one or more memories comprising instructions executable by the one or more processors to cause the apparatus to:

identify a transition of a user equipment (UE) from a connected state to an inactive state;

transmit, during a first transponder occasion, a transponder search message that comprises an identifier associated with a notification area of the base station via a first beam;

receive a first transponder response message comprising a second identifier associated with the UE;

determine a location of the UE based at least in part on the first transponder response message;

identify a first periodicity for a plurality of transponder occasions associated with the notification area, the plurality of transponder occasions comprising the first transponder occasion; and transmit the transponder search message in each of the plurality of transponder occasions in accordance with the first periodicity.

14. The apparatus of claim 13, wherein the instructions are further executable by the one or more processors to cause the apparatus to:

identify a second periodicity for transmitting one or more paging messages during a plurality of paging occasions, wherein the second periodicity for transmitting the one or more paging messages is longer than the first periodicity for transmitting the transponder search message;

transmit the one or more paging messages based at least in part on the second periodicity; and receive, during a first paging occasion, an indication of the location of the UE based at least in part on the first transponder response message.

15. The apparatus of claim 13, wherein the first periodicity is based at least in part on a mobility profile of the UE, power consumption of the UE, or both.

16. The apparatus of claim 13, wherein the instructions to determine the location of the UE are further executable by the one or more processors to cause the apparatus to:

determine an angle of arrival of the first beam associated with receiving the first transponder response message; and determine a relative direction of the UE with respect to the base station based at least in part on the angle of arrival of the first beam.

17. The apparatus of claim 13, wherein the instructions are further executable by the one or more processors to cause the apparatus to:

determine a round-trip time between transmitting the transponder search message and receiving the first transponder response message; and determine a relative distance of the UE with respect to the base station based at least in part on the round-trip time.

18. The apparatus of claim 13, wherein the transponder search message is associated with a correlation property for detection using an analog correlation circuit.

\* \* \* \* \*